（12）United States Patent
Lin et al.

(10) Patent No.: US 10,780,510 B2
(45) Date of Patent: *Sep. 22, 2020

(54) FOLDABLE MITER SAWS AND FOLDABLE METHOD OF MITER SAW

(71) Applicant: Rexon Industrial Corp., Ltd, Taichung (TW)

(72) Inventors: Ju Zhen Lin, Taichung (TW); Ya Pin Kuo, Taichung (TW); Hung-Jung Chiang, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/352,788

(22) Filed: Nov. 16, 2016

(65) Prior Publication Data

US 2017/0189976 A1 Jul. 6, 2017

Related U.S. Application Data

(63) Continuation of application No. PCT/US2015/049147, filed on Sep. 9, 2015.
(Continued)

(30) Foreign Application Priority Data

Sep. 12, 2014 (TW) .................................. 103131612
Nov. 16, 2015 (TW) .................................. 104137658

(51) Int. Cl.
*B23D 45/04* (2006.01)
*B23D 45/14* (2006.01)
(Continued)

(52) U.S. Cl.
CPC .......... *B23D 45/044* (2013.01); *B23D 45/14* (2013.01); *B23D 57/0092* (2013.01); *B27B 5/29* (2013.01); *B27G 19/02* (2013.01)

(58) Field of Classification Search
CPC .. B23D 45/044; B23D 45/14; B23D 57/0092; B27B 27/06; B27B 5/29; B27L 327/06; B27G 19/02
(Continued)

(56) References Cited

U.S. PATENT DOCUMENTS 1,486,140 A * 3/1924 Hickey ................. A01G 3/053
                                                    185/39
4,523,504 A * 6/1985 Alessio ............. B23D 57/0092
                                                    144/48.3
(Continued)

FOREIGN PATENT DOCUMENTS

EP        2774731 A1     9/2014
JP        H11_90901 A    4/1999
(Continued)

*Primary Examiner* — Kenneth E Peterson
*Assistant Examiner* — Nhat Chieu Q Do
(74) *Attorney, Agent, or Firm* — Bacon & Thomas, PLLC

(57) ABSTRACT

Foldable miter saws and a folding method of miter saws are disclosed. The foldable miter saws includes a base unit, a worktable, and a cutting unit. The cutting unit includes a support arm pivotally mounted on the worktable, a saw blade, and a driver. The miter saw folding method includes the step of biasing the cutting unit relative to the base unit and the step of rotating the support arm relative to the base unit and the worktable to change the cutting unit from a working position to a folded position, thus reducing the vertical space occupied by the cutting unit and facilitating delivery, storage and package of the foldable miter saws.

11 Claims, 21 Drawing Sheets

Related U.S. Application Data

(60) Provisional application No. 62/048,442, filed on Sep. 10, 2014, provisional application No. 62/255,694, filed on Nov. 16, 2015.

(51) Int. Cl.
  *B27B 5/29* (2006.01)
  *B27G 19/02* (2006.01)
  *B23D 57/00* (2006.01)

(58) Field of Classification Search
  USPC ........ 83/471.3, 468.7, 477, 471, 581, 477.1, 83/859, 574, 473, 70; 30/208–210, 30/216–220
  See application file for complete search history.

(56) References Cited

U.S. PATENT DOCUMENTS

| | | | | |
|---|---|---|---|---|
| 6,474,207 B1* | 11/2002 | Itzov | ............... | B23D 45/044 |
| | | | | 83/471.3 |
| 9,283,628 B2* | 3/2016 | Gehret | ............... | B23D 45/044 |
| 9,393,630 B2* | 7/2016 | He | ............... | B27B 5/165 |
| 2003/0024366 A1 | 2/2003 | Hollinger et al. | | |
| 2003/0221531 A1* | 12/2003 | Anthony | ............... | B23D 45/044 |
| | | | | 83/581 |
| 2005/0076618 A1 | 4/2005 | Powers et al. | | |
| 2005/0247177 A1* | 11/2005 | Hetcher | ............... | B23D 45/044 |
| | | | | 83/471.3 |
| 2008/0110314 A1 | 5/2008 | Johnson et al. | | |
| 2009/0139382 A1 | 6/2009 | Clack | | |
| 2010/0031795 A1 | 2/2010 | Collins | | |
| 2011/0107892 A1* | 5/2011 | Imamura | ............... | B23D 45/048 |
| | | | | 83/471.3 |
| 2013/0104717 A1* | 5/2013 | Rees | ............... | B23D 45/048 |
| | | | | 83/468.7 |
| 2013/0133495 A1* | 5/2013 | Imamura | ............... | B23D 47/02 |
| | | | | 83/471.3 |
| 2013/0160628 A1 | 6/2013 | Chiu | | |
| 2014/0202297 A1* | 7/2014 | Sasaki | ............... | B23D 45/044 |
| | | | | 83/471.3 |
| 2014/0251106 A1* | 9/2014 | Gehret | ............... | B23D 45/044 |
| | | | | 83/471.3 |
| 2015/0246399 A1* | 9/2015 | Knight | ............... | B23D 45/044 |
| | | | | 83/397 |

FOREIGN PATENT DOCUMENTS

| | | |
|---|---|---|
| TW | 201325776 A | 7/2013 |
| TW | 201420239 A | 6/2014 |
| WO | WO2014150859 A1 | 9/2014 |

* cited by examiner

FOLDABLE MITER SAWS AND FOLDABLE METHOD OF MITER SAW

CROSS REFERENCE TO RELATED APPLICATION

This application is a continuing application of PCT/US2015/049147, filed Sep. 9, 2015, which claims benefit of provisional application Ser. No. 62/048,442 filed Sep. 10, 2014; and also Taiwan Application 103131612 filed Sep. 12, 2014, and also includes Applicants' joint invention based on Taiwan Application 104137658 filed Nov. 16, 2015, and corresponding provisional application 62/255,694 filed Nov. 16, 2015, which applications are herein incorporated by reference.

BACKGROUND OF THE INVENTION

1. Field of the Invention

The present invention relates to processing machinery, and more particularly, to a foldable miter saw and a foldable miter saw folding method.

2. Description of the Related Art

A conventional miter saw (Prior art of Taiwan Patent 201325776) is known comprising a base unit, a worktable rotatable relative to the base unit, a cutting unit connected to the worktable at one lateral side, and a positioning unit. The base unit comprises a bottom frame, and two foot stands respectively fixedly mounted at two opposite lateral sides of the bottom frame. The positioning unit comprises a screw rod threaded into the worktable. When adjusting the cutting angle of the cutting unit, the operator must loosen the screw rod, and then operate the worktable to rotate the cutting unit relative to the base unit. After moving the cutting unit to the desired angle, the screw rod is again tightened.

Further, in Taiwan Patent 201420239, matching between a sector plate-shaped locking member and a positioning unit allows adjustment of the tilting angle of a saw blade of a cutting unit relative to a top wall of a worktable to achieve the desired cutting angle. The maximum tilting angle of the saw blade relative to the top wall of the worktable is 45°.

The aforesaid prior art miter saws allow adjustment of the cutting angle, however, when these miter saws are not in use, the bulk size of these miter saws require a large storage space. Further, when packaging the miter saws for delivery after fabrication, they require much delivery space, which increases the delivery cost.

SUMMARY OF THE INVENTION

The present invention has been accomplished under the circumstances noted above. It is the main object of the present invention to provide a foldable miter saw, which can be folded into a folded position to reduce the size of the miter saw for convenient storage and delivery.

It is another object of the present invention to provide a miter saw folding method, which is easy to implement and facilitates collapsing the miter saw for storage and transport To achieve these and other objects of the present invention, the foldable miter saw comprises a base unit, a worktable and a cutting unit. The base unit comprises a front edge, a rear edge opposite to the front edge, a bottom wall extended from the front edge to said rear edge, and a top wall opposite to the bottom wall.

The worktable is rotatably mounted at the base unit, comprising a working surface disposed opposite to the bottom wall corresponding to the top wall and an axle holder facing toward the rear edge and connected to the working surface. Further, the axle holder comprises an axis disposed in parallel to the working surface and extending from the rear edge toward the front edge.

The cutting unit comprises a support arm pivotally connected to the axle holder of the worktable and biasable relative to the base unit and the worktable, a saw blade is mounted at the support arm, and a driver mounted at the support arm and adapted for driving the saw blade to rotate. The saw blade comprises a first end face, and a second end face opposite to the first end face.

The support arm is turnable about said axis relative to the base unit and the worktable to move the cutting unit from a working position where a contained angle within 90° to 45° is formed between the saw blade and the worktable to a folded position where the second end face is disposed in proximity to the working surface and faces toward the working surface.

To achieve these and other objects of the present invention, a foldable miter saw comprises a base unit, a worktable and a cutting unit is provided. The base unit comprises a front edge, a rear edge opposite to the front edge, a bottom wall and a top wall opposite to the bottom wall. The worktable is mounted at the base unit, comprising an axle holder.

The cutting unit comprises a support arm pivotally connected to the axle holder of the worktable and is biasable relative to the base unit and the worktable, a saw blade mounted at said support arm and a driver mounted at said support arm and adapted for driving said saw blade to rotate. The cutting unit is convertible between a working position and a folded position. When in the working position, the cutting unit is movable between a lifted condition and a pressed condition. When the cutting unit is in the pressed condition, a working height is defined between the bottom wall of the base unit and the opposing topmost edge of the cutting unit. When the cutting unit is disposed in the folded position, the support arm can be turned about the axis relative to the base unit and the worktable so that a minimum height is defined between the bottom wall of the base unit and the opposing topmost edge of the cutting unit. Further, the working height is larger than the minimum height. The minimum height is about one half of the working height.

To achieve these and other objects of the present invention, a miter saw folding method comprises the steps as follows:

(A) Prepare a miter saw comprising a base unit, a worktable and a cutting unit. The base unit comprises a front edge, a rear edge opposite to the front edge, a bottom wall extended from the front edge to the rear edge, a top wall opposite to the bottom wall, and a fence fixedly mounted at the top wall. The worktable is mounted at the base unit. The worktable comprises a working surface disposed opposite to the bottom wall and corresponding to the top wall, and an axle holder facing toward the rear edge and connected to the working surface. The axle holder comprises an axis disposed in parallel to the working surface and extending from the rear edge toward the front edge. The cutting unit comprises a support arm pivotally connected to the axle holder of the worktable and biasable relative to the base unit and the worktable, a saw blade mounted at the support arm, and a driver mounted at the support arm and adapted for driving the saw blade to rotate. The saw blade comprises a first end face and a second end face opposite to the first end face. The support arm is turnable about the axis relative to the base unit and the worktable.

(B) Enable the cutting unit to be disposed in a working position where a contained angle within 90° to 45° is formed between the saw blade and the worktable.

(C) Operate the base unit and the cutting unit for relative rotation therebetween.

(D) Bias the support arm relative to the axle holder to turn the cutting unit about the axis relative to the worktable until the second end face of the saw blade is disposed in proximity to the working surface where the cutting unit is disposed in a folded position.

Accordingly, by means of turning the support arm relative to the base unit and the worktable and converting the cutting unit in the folded position, the size of the foldable miter saw is minimized, thus facilitating storage and delivery and reducing the package volume and delivery cost of the foldable miter saw.

In a further aspect of this invention, a foldable miter saw comprises a base unit, a worktable and a cutting unit. The base unit comprises a front edge, a rear edge opposite to the front edge, a first side edge between the front edge and the rear edge, a second side edge opposite to the first side edge, a bottom wall extended from the front edge to the rear edge, and a top wall opposite to the bottom wall.

The worktable is rotatably mounted on the base unit, comprising a turntable, an axle holder facing toward the rear edge and connected to the turntable, and an extension member facing toward the front edge and connected to the turntable. The turntable defines a working surface opposite to the bottom wall and corresponding to the top wall. The axle holder defines an axis in parallel to the working surface and extending from the rear edge toward the front edge.

The cutting unit comprises a support base pivotally connected to the axle holder of the worktable and rotatable relative to the base unit and the worktable, a sliding member slidably coupled to the support base, a cantilever pivotally connected to the sliding member, a saw blade mounted at the cantilever, and a driver mounted at the cantilever and adapted for driving the saw blade to rotate. The support base comprises at least one guiding member for allowing the sliding member to slide thereon.

The sliding member comprises at least one sliding coupling component coupled to and slidable along the guiding member, the cutting unit being turnable about the axis relative to the base unit and the worktable, and allowing the worktable and the cutting unit to be folded between a working position where the saw blade of the cutting unit defines with the worktable a predetermined contained angle within 90° to 45°, and a folded position where an end face of the saw blade of the cutting unit is disposed in proximity to the working surface; the guiding member and the sliding coupling component are disposed in proximity to the working surface.

The invention has the effect of: utilizing the design that the cutting unit is biasable relative to the base unit and the worktable, the cutting unit can be folded (rotated) from the working position to the folded position to significantly reduce the dimension of the foldable miter saw, facilitating storage and delivery, saving packing and delivery costs.

Other and further benefits, advantages and features of the present invention will be understood by reference to the following specification in conjunction with the accompanying drawings, in which like reference characters denote like elements of structure.

BRIEF DESCRIPTION OF THE DRAWINGS

Other advantages and features of the present invention will be fully understood by reference to the following description in conjunction with the accompanying drawings, in which like reference signs denote like components of structure.

Figure 1:
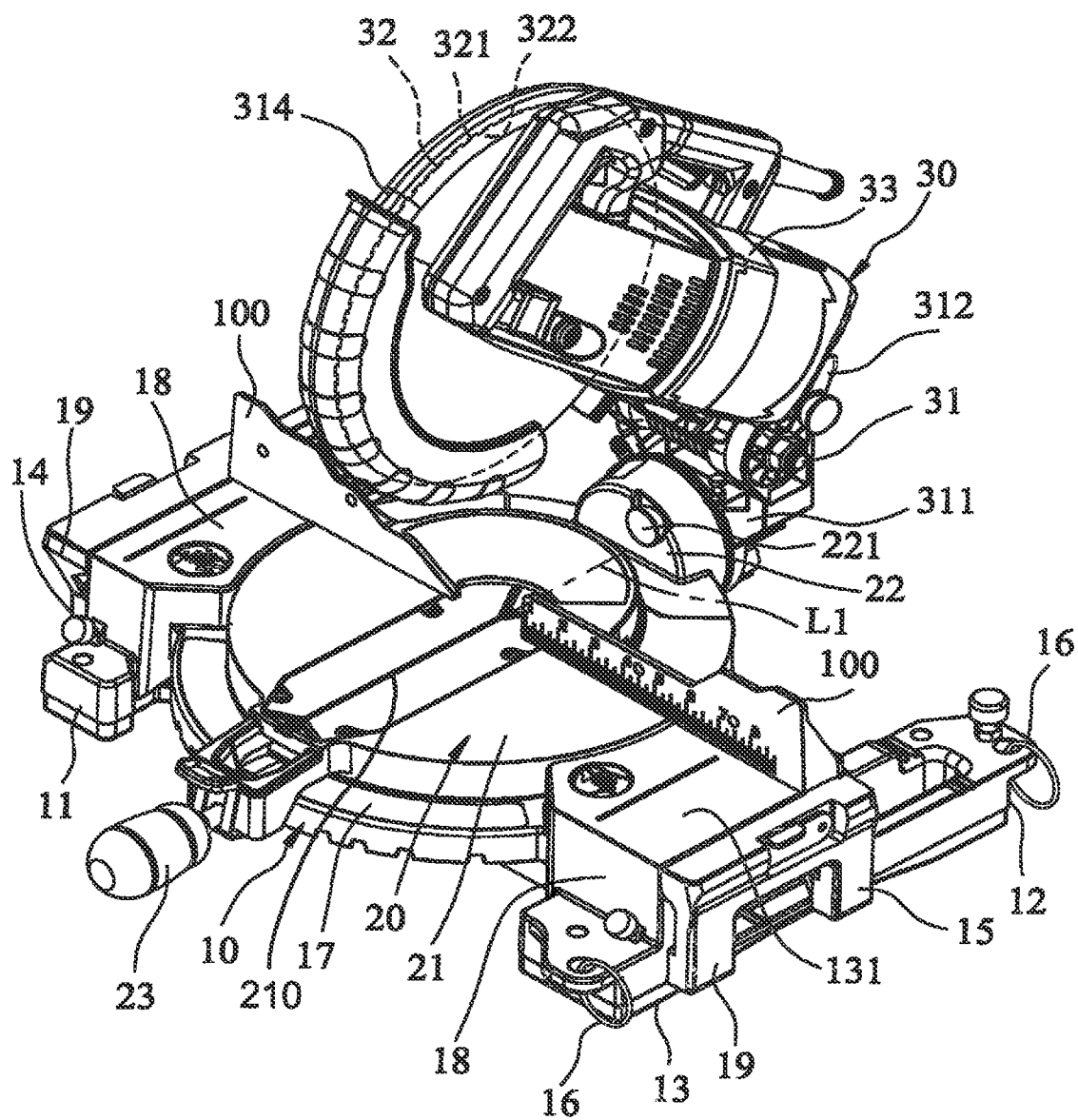
FIG. 1 is a perspective view of a foldable miter saw in accordance with a first embodiment of the present invention.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate exemplary embodiments of the present invention and the components thereof, and in no way limits the structures, configurations and components thereof according to the present disclosure.

DETAILED DESCRIPTION OF THE INVENTION

Figure 2:
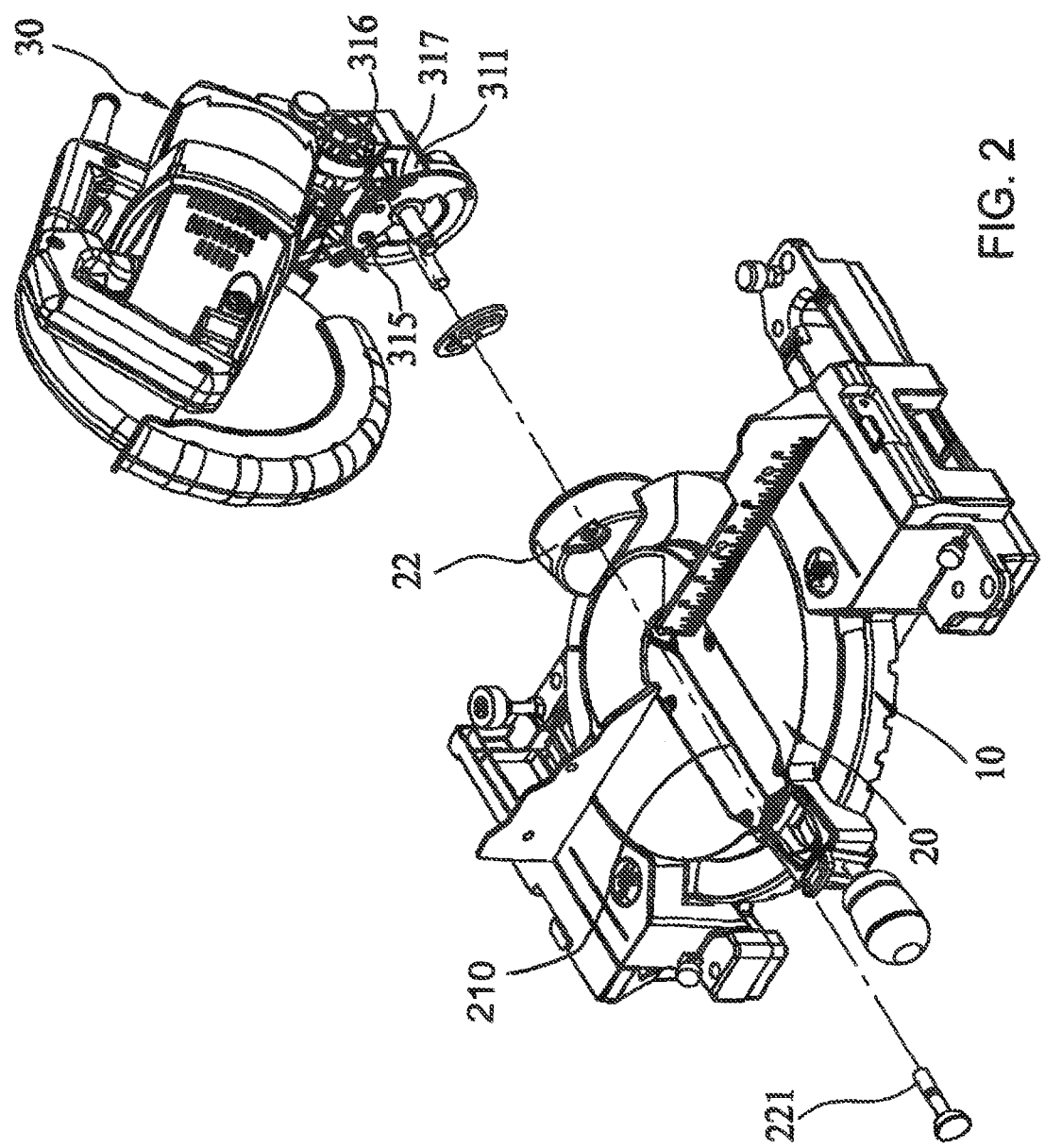
FIG. 2 is an exploded view of the foldable miter saw in accordance with the present invention.
Figure 3:
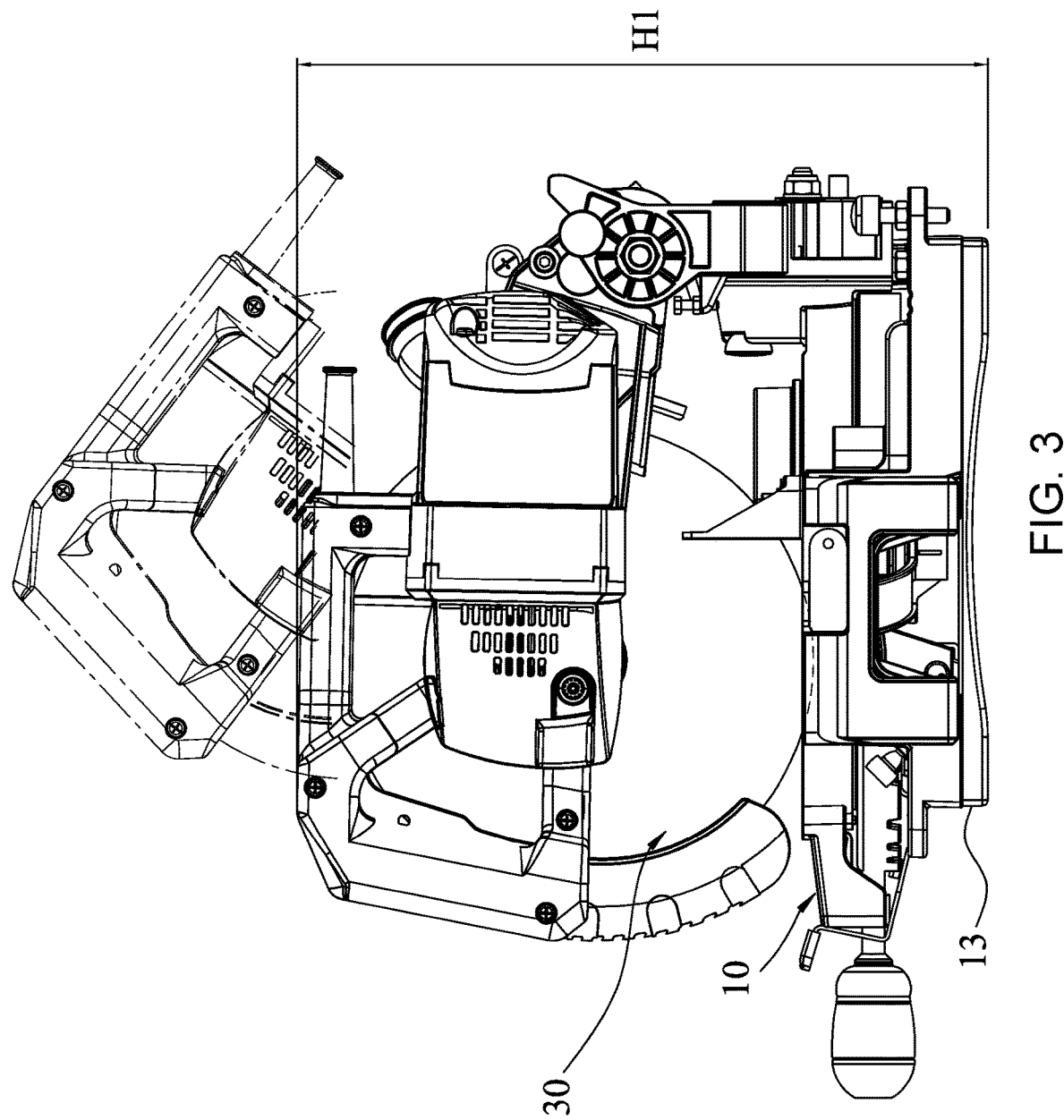
FIG. 3 is a schematic side plan view of the foldable miter saw in accordance with the present invention.

Referring to FIGS. 1, 2 and 3, a foldable miter saw in accordance with the first embodiment of the present invention is shown. The foldable miter saw comprises a base unit 10, a worktable 20, and a cutting unit 30.

The base unit 10 comprises a front edge 11, a rear edge 12 disposed opposite to the front edge 11, a bottom wall 13 extended from the front edge 11 to the rear edge 12, a top wall 131 disposed opposite to the bottom wall 13, a left edge 14 connected between the front edge 11 and the rear edge 12, a right edge 15 disposed opposite to the left edge 14, two hanging rings 16 respectively connected to the right edge 15 and spaced from each other at a predetermined distance.

Figure 10:
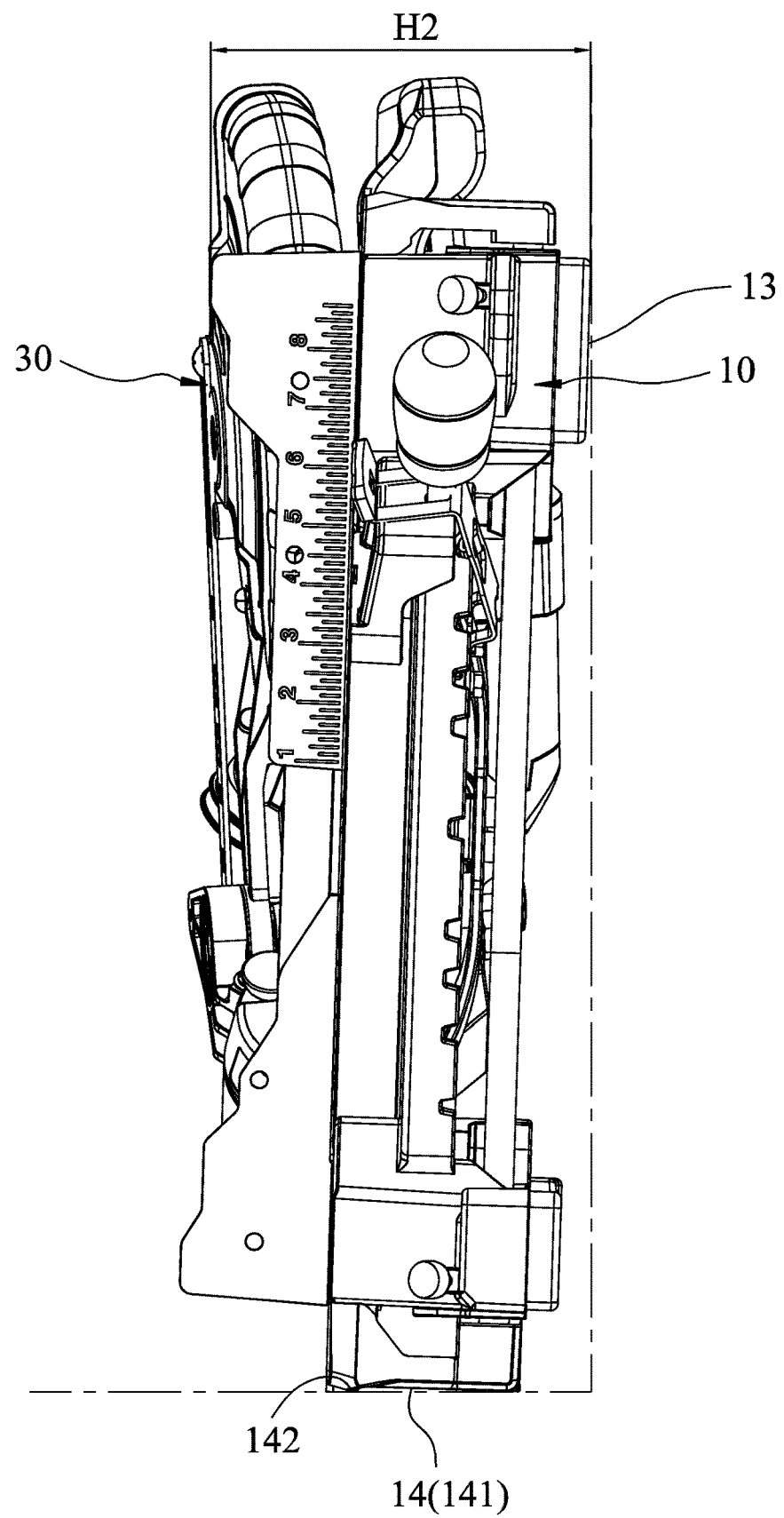
FIG. 10 is a schematic drawing illustrating the base unit of the foldable miter saw erected for storage.

Structurally, the base unit 10 comprises a disk-like bottom frame 17, two foot stands 18 radially connected to two opposite lateral sides of the bottom frame 17, and two support blocks 19 respectively and retractably coupled to the foot stands 18 at an outer side. The front edge 11 and the rear edge 12 are respectively formed along a periphery of the disk-like bottom frame 17 and the foot stands 18. The left edge 14 and the right edge 15 are respectively formed on the foot stands 18 at an outer side. The top wall 131 is formed on the foot stands 18 at a top side. Referring also to FIG. 10, the left edge 14 has a flat surface portion 141 defined therein that extends from the bottom wall 13 toward the top wall 131 and is perpendicularly intersected with the bottom wall 13. A protruding portion 142 is connected to a top side of the flat surface portion 141 and outwardly protruded from flat surface portion 141 in proximity to the top wall 131. The base unit 10 further comprises a fence 100 fixedly mounted at the top wall 131. The fence 100 extends from the tops of the foot stands 18 to a top side above the bottom frame 17.

The worktable 20 is rotatably mounted on a top of the bottom frame 17 of the base unit 10. The worktable 20 has a working surface 21 formed thereon and corresponding to the top wall 131 and opposite to the bottom wall 13, an axle holder 22 connected to the working surface 21 corresponding to the rear edge 12, and an operating handle 23 arranged opposite to the axle holder 22 and extended outwardly relative to the working surface 21. The working surface has a longitudinal slot 210. The axle holder 22 comprises an axis L1 extending from the rear edge 12 toward the front edge 11 in a parallel manner relative to the working surface 21, and an operable locking pin 221. Further, the fence 100 extends from the top wall 131 to the top side of the working surface 21.

Figure 4:
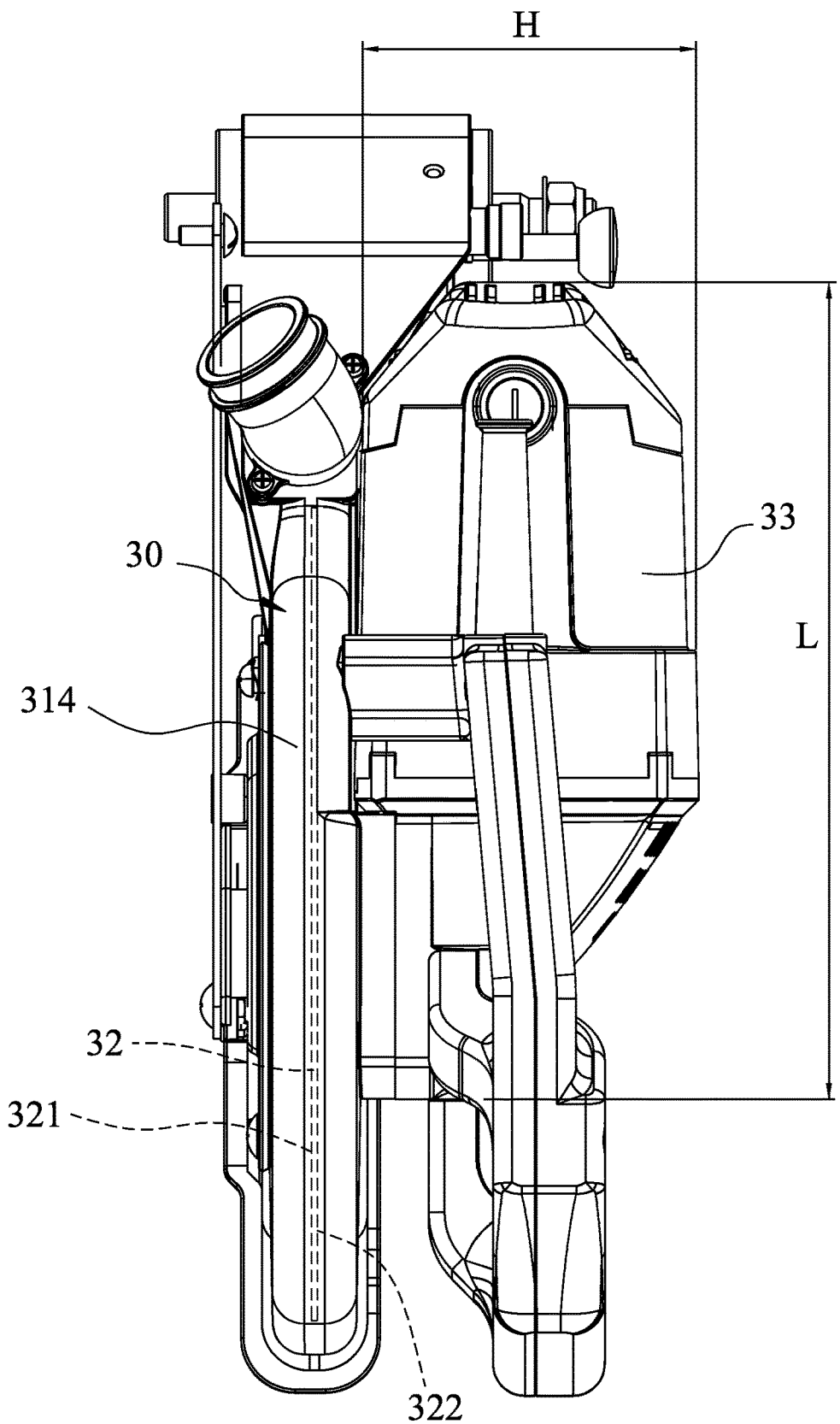
FIG. 4 is a schematic top view of the cutting unit of the foldable miter saw in accordance with the present invention.

The cutting unit 30 comprises a support arm 31 pivotally coupled to the axle holder 22 of the worktable 20 and biasable relative to the base unit 10 and the worktable 20, a saw blade 32 mounted at the support arm 31, and a driver 33 mounted at the support arm 31 and adapted for driving the saw blade 32 to rotate. The support atm 31 is turnable about the axis L1 relative to the base unit 10 and the worktable 20, and includes a rotating member 311 connected to an outer side of the axle holder 22 and extending along the axis L1, a cantilever member 312 is pivotally connected to the rotating member 311, a locking member 313 is disposed in parallel to the axis L1 and adapted for locking the rotating member 311 to the axle holder 22 (see FIG. 6), and a saw blade guard 314 partially shields the saw blade 32. As illustrated in FIG. 2, the rotating member 311 has a plurality of equiangularly spaced locating holes 315, 316, 317 defined therein for selectively engaging with the locking pin 221. The locating hole 317 is of elongated arcuate shape. The saw blade 32 comprises a first end face 321, and a second end face 322 opposite to the first end face 321. The driver 33 faces toward the second end face 322, having a length L which is parallel to the saw blade 32 and a width H which is perpendicular to the saw blade 32 (see FIG. 4). The length L is larger than the width H.

Figure 5:
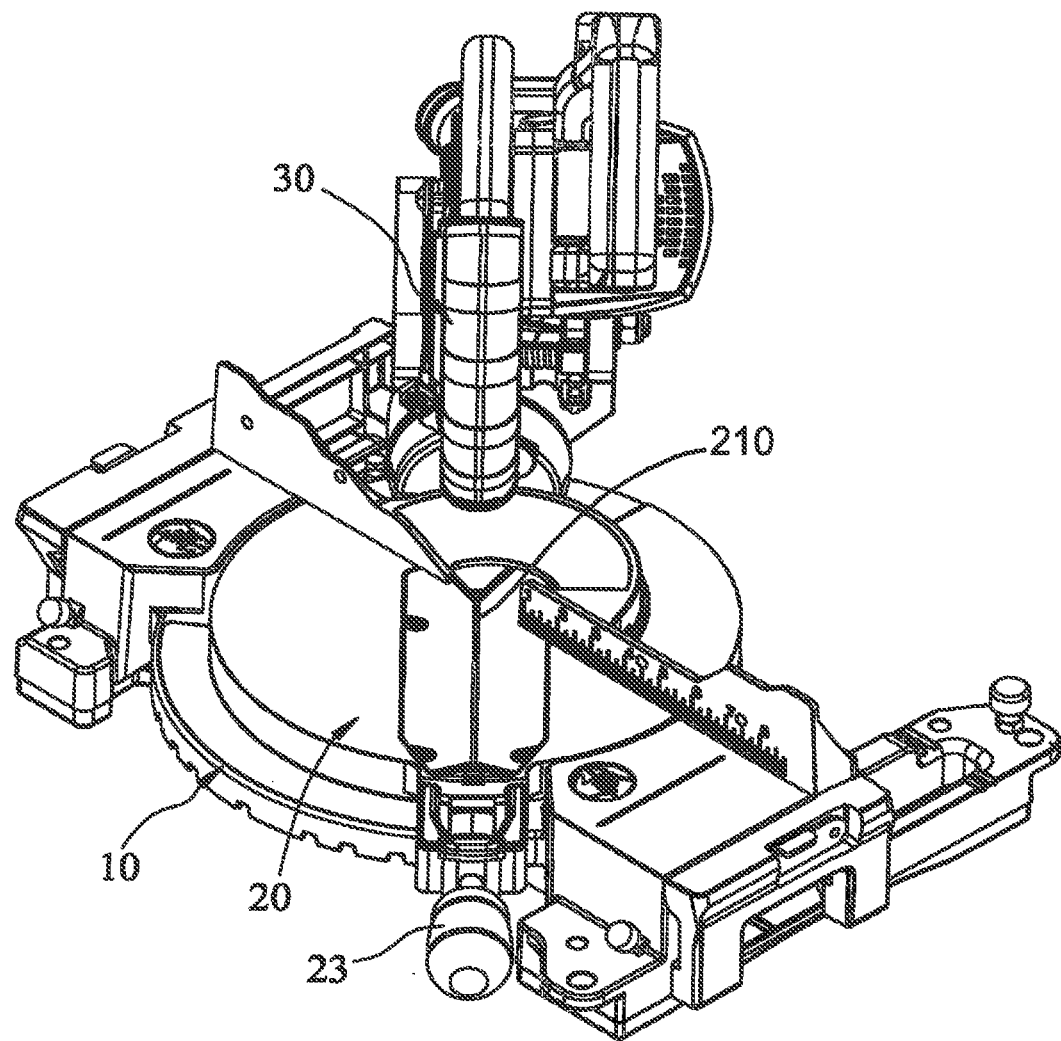
FIG. 5 is a schematic operating view of the present invention, illustrating the cutting unit turned with the worktable through 45° relative to the base unit.

As illustrated in FIG. 1 and FIG. 3, the miter saw is shown fully assembled and set in a working position. In the working position, the driver 33 is suspended above the working surface 21 of the worktable 20. When the workpiece is placed on the working surface 21 and stopped against the fence 100, the saw blade 32 is vertically moved up and down relative to the rotating member 311 by operating the cantilever member 312 of the cutting unit 30, thereby performing a vertical cutting operation during which the rotating saw blade 32 is moved from a lifted position in which the saw blade 32 is spaced from the worktable, and a pressed position in which, upon cutting through a workpiece, an edge of the saw blade enters the longitudinal slot 210. As illustrated in FIG. 5, the operator biases the operating handle 23 for turning the worktable 20 and the cutting unit 30 relative to the base unit 10 for performing miter cut. As illustrated in FIGS. 1 and 2, the operator operates the locking member 313 and the locking pin 221 for enabling the support arm 31 to turn the saw blade 32 about the axis L1 relative to the worktable 20 within a predetermined angle range for performing bevel cuts. The support arm 31 is driven to turn the saw blade 32 about the axis L1 toward a left side or a right side, such that the locking pin 221 is either engaged with the middle locating hole 316 or the right-sided elongated arcuate locating hole 317 for locking the saw blade 32 in a position where a predetermined contained angle (not less than 40°) is formed between the second end face 322 of the saw blade 32 and the working surface 21, and the driver 33 is suspended above the working surface 21 of the worktable 20, thus a bevel cut can be performed. When the miter saw is temporarily not in use and needs to be stored or packed for delivery, the miter saw can be folded into a collapsed condition. The folding method comprises the steps as follows:

Step I: As shown in FIG. 1, prepare a miter saw as described above.

Step II: Set the cutting unit 30 in the working position where a contained angle formed between the saw blade 32 and the worktable 20 is between 90°~45°, i.e., selectively engaging the locking pin 221 in the locating hole 316 or 317 to adjust the contained angle between the second end face 322 of the saw blade 32 and the working surface 21.

Step III: Turn the cutting unit 30 relative to the base unit 10, for example, in the present embodiment, the operator can rotate the worktable 20 and the cutting unit 30 to the position shown in FIG. 5, such that the cutting unit 30 is driven by the worktable 20 to rotate 45° toward the left edge 14.

Step IV: Thereafter, as shown in FIGS. 6-9, the operator operates the locking member 313 and the locking pin 221 to disengage the locking pin 221 from the locating hole 316 or 317 and then biases the support arm 31 with the rotating member 311 relative to the axle holder 22 for turning the cutting unit 30 about the axis L1 relative to the worktable 20 to the folded position where the second end face 322 of the saw blade 32 is kept in proximity and parallel to the working surface 21. The locking pin 221 is inserted into the locating hole 315 to lock the cutting unit 30 in the folded position.

When the cutting unit 30 is locked in the folded position, the driver 33 is kept in proximity to the bottom wall 13 at a back side relative to the worktable 20 to face toward the rear edge 12, the rotating member 311 and the cantilever member 312 are disposed at the back side relative to the worktable 20, and the cutting unit 30 is disposed at a back side relative to the fence 100.

Thus, by performing the successive steps of the miter saw folding method of the present invention, an operator can fold the cutting unit 30 from a working position to the folded position.

Figure 6:
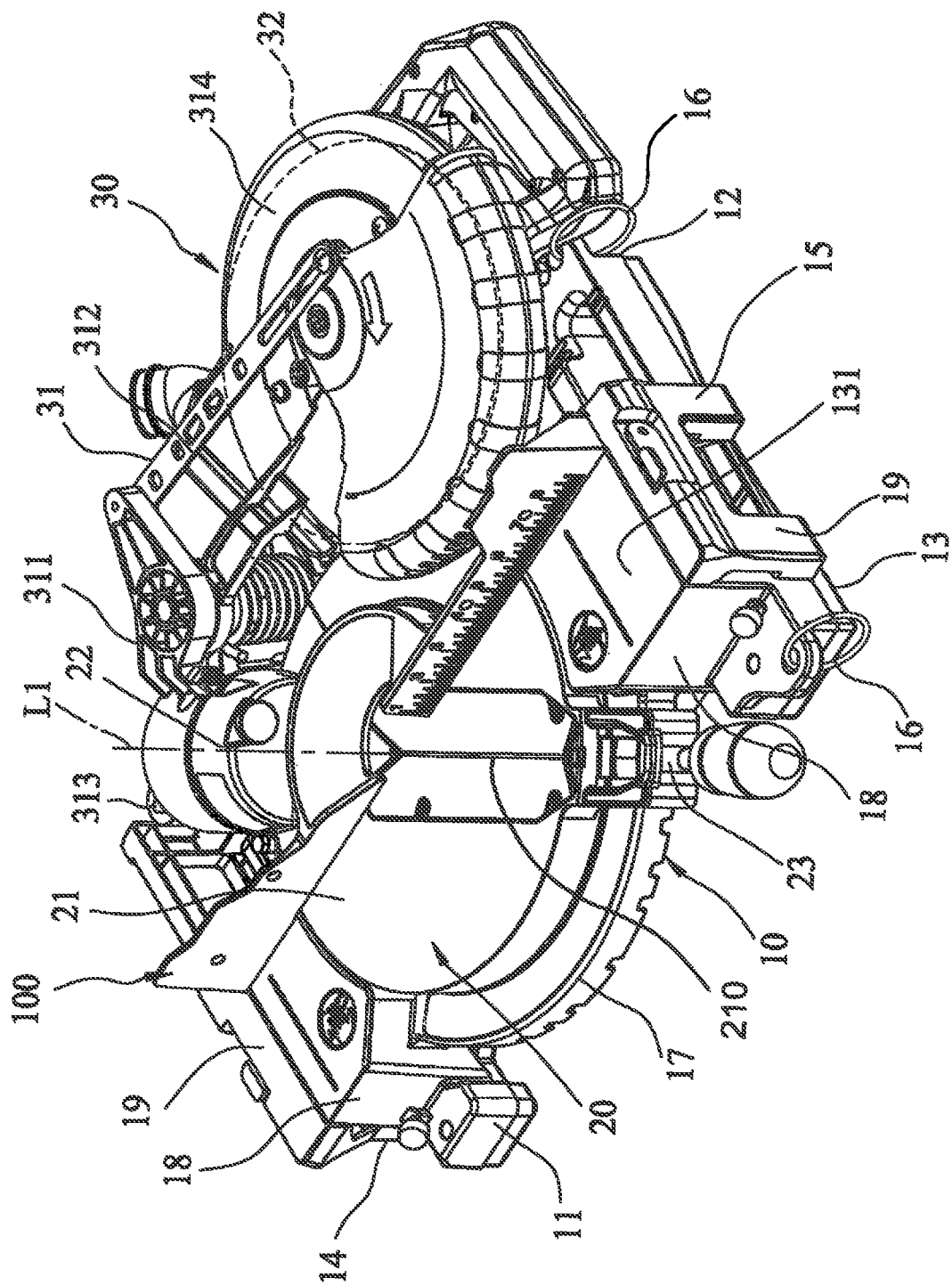
FIG. 6 is a top view of the present invention, illustrating the foldable miter saw in the folded position and the cutting unit received at the back side relative to the base unit.
Figure 7:
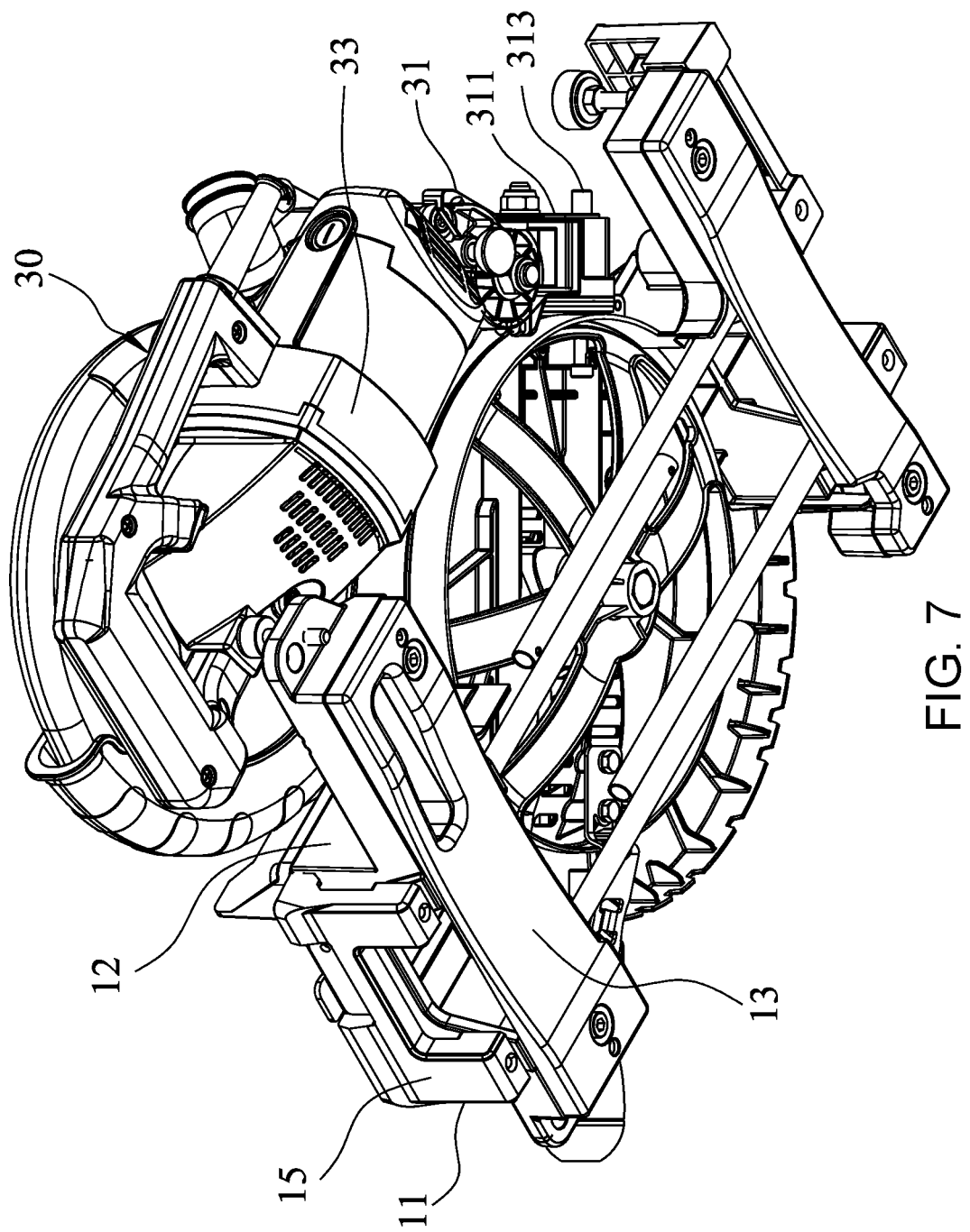
FIG. 7 is a bottom perspective view of the present invention, illustrating the foldable miter saw in the folded position.

It's worth mentioning that except for the definition of the working position and folded position of the cutting unit 30 as described above, it can also be defined as follows. As illustrated in FIG. 3, when the cutting unit 30 is set in the working position, the cantilever member 312 of the cutting unit 30 can be biased relative to the rotating member 311 and the worktable 20 between a lifted condition (refer to the imaginary line in FIG. 3) and a pressed condition (see the solid line in FIG. 3). When the cutting unit 30 is biased to the pressed condition, a working height H1 is defined between the bottom wall 13 of the base unit 10 and the opposing topmost edge of the cutting unit 30. As illustrated in FIG. 6 and FIG. 10, when the cutting unit 30 is disposed in the folded position, the support arm 31 can be turned about the axis L relative to the base 10 and the worktable 20 so that a minimum height H2 is defined between the bottom wall 13 of the base unit 10 and the opposing topmost edge of the cutting unit 30. The working height H1 is larger than the minimum height H2. Further, the minimum height H2 is about one half of the working height H1.

It's also worth mentioning that the base unit of the foldable miter saw of the invention is not limited to the configuration described above. For example, the base unit can be as described in Taiwan Patent M374926, comprising a worktable, and first and second rotating units rotatable relative to the worktable. This alternate form can also achieve the expected operating and folding purposes (not shown).

Referring to FIG. 10, the protruding portion 142 of the left edge 14 protrudes outwardly from the flat surface portion 141, such that the left edge 14 can be abutted against the floor after the cutting unit 30 has been set in the folded position, thus enabling the bottom wall 13 of the base unit 10 to be supported on the wall. In this way, the bottom wall 13 is upwardly extended and gradually oriented toward the wall, preventing the foldable miter saw from falling down to the floor. Thus, the invention facilitates miter saw storage and space utilization.

Figure 11:
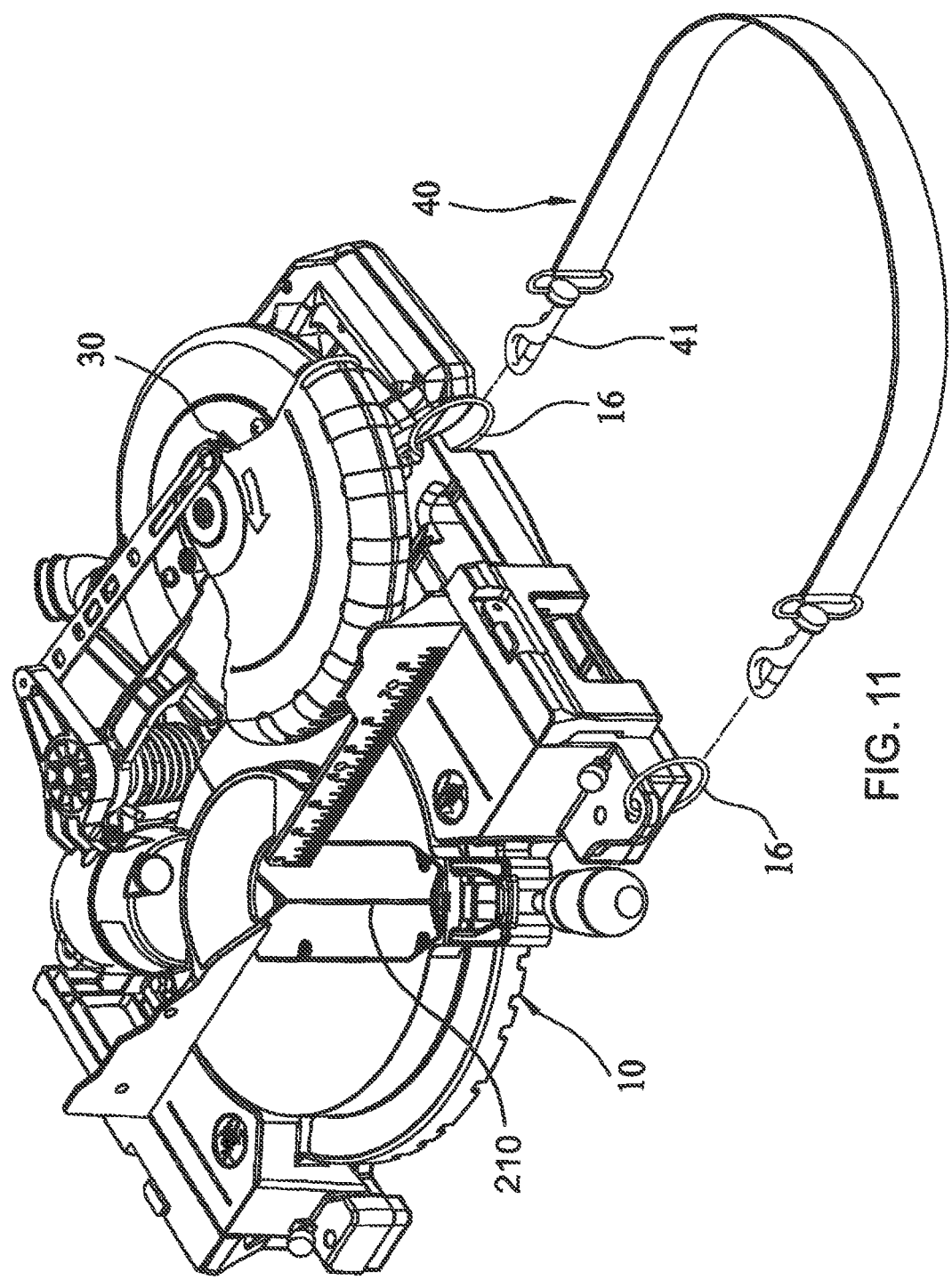
FIG. 11 is a schematic drawing illustrating a shoulder strap fastened to the base unit of the foldable miter saw for carrying.

Referring to FIG. 11, the foldable miter saw of the invention further comprises a shoulder strap 40. The shoulder strap 40 comprises two buckles 41 respectively detachably fastened to the hanging rings 16 of the base unit 10. By buckling the shoulder strap 40 to the base unit 10 after the foldable miter saw has been locked in the folded position, the foldable miter saw can be conveniently carried by a person for delivery.

Figure 12:
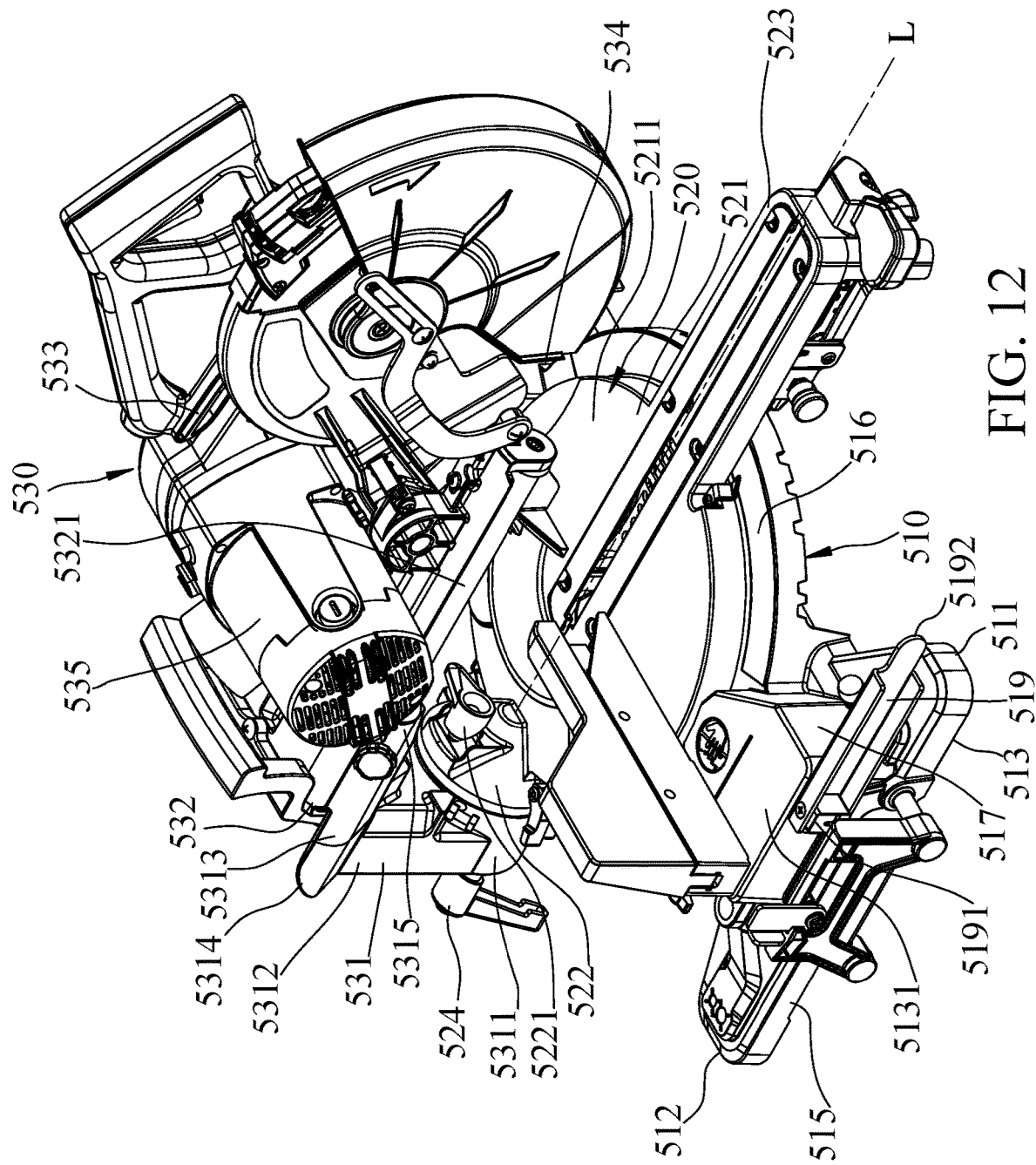
FIG. 12 is an oblique top elevational view of a foldable miter saw in a working position in accordance with a second embodiment of the present invention.
Figure 13:
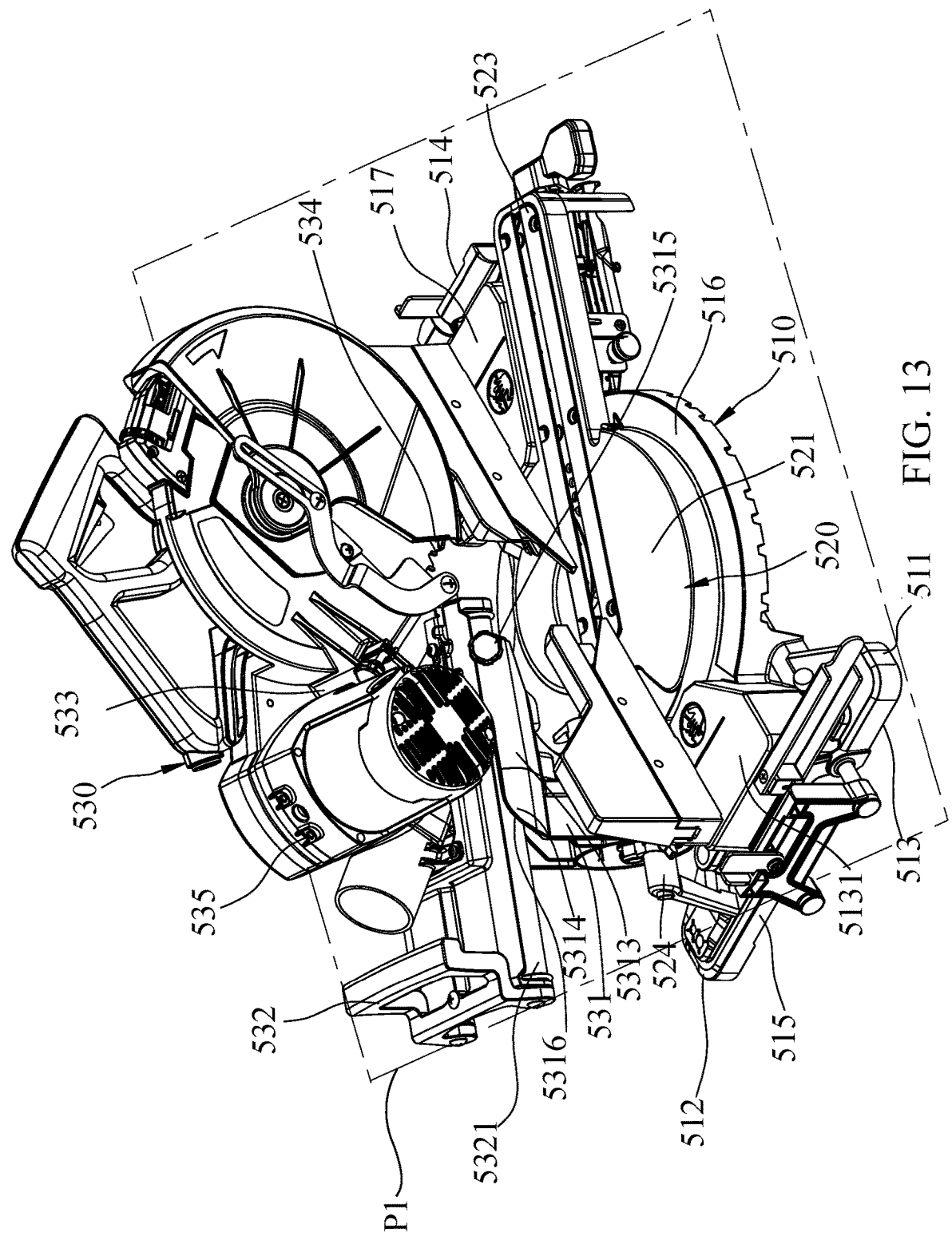
FIG. 13 is another oblique top elevational view of the second embodiment of the present invention, illustrating the foldable miter saw in an oblique cutting position.

In a further embodiment of the invention and referring to FIGS. 12 and 13, a foldable miter saw in accordance with the second embodiment of the present invention is shown. The foldable miter saw comprises a base unit 510, a worktable 520, a cutting unit 530, and a safety switch unit 540 (see FIGS. 19, 20 and 21).

The base unit 510 comprises a front edge 511, a rear edge 512 disposed opposite to the front edge 511, a bottom wall 513 extended from the front edge 511 to the rear edge 512, a top wall 5131 disposed opposite to the bottom wall 513, a first side edge 514 connected between the front edge 511 and the rear edge 512, and a second side edge 515 disposed opposite to the first side edge 514.

Structurally, the base unit 510 comprises a disk-like bottom frame 516, two foot stand holders 517 respectively and horizontally connected to two opposite lateral sides of the disk-like bottom frame 516. Further, the front edge 511 and the rear edge 512 each are respectively formed by the disk-like bottom frame 516 and the foot stand holders 517 (The peripheries of the disk like bottom frame 516 and the foot stand holders 517 formed the front edge 511 and the rear edge 512). The first side edge 514 and the second side edge 515 are respectively formed on the foot stand holders 517 at an outer side. The top wall 5131 is formed on the foot stand holders 517 at a top side.

Figure 15:
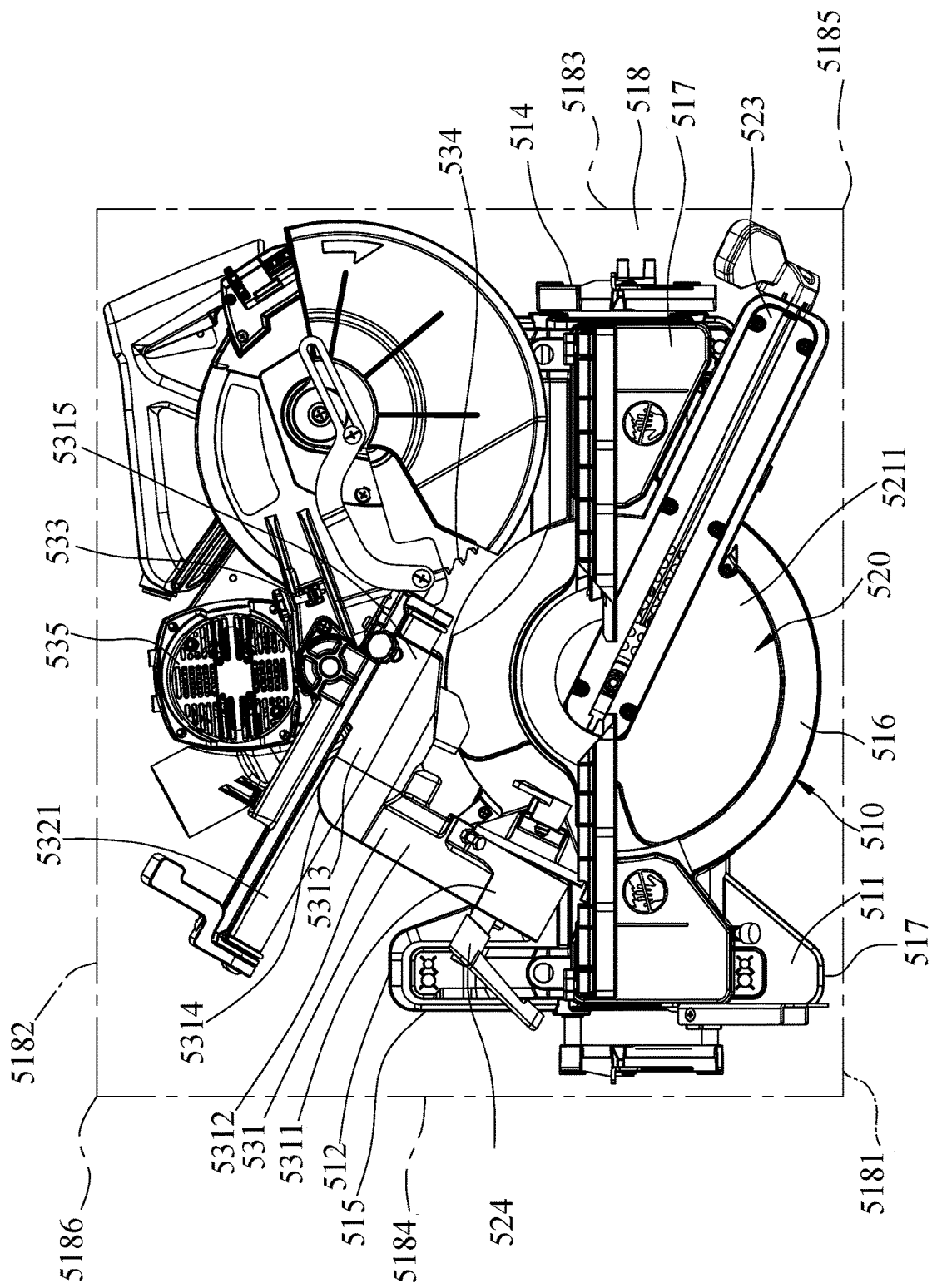
FIG. 15 is a top view of the second embodiment of the present invention, illustrating the foldable miter saw in the folded position.
Figure 16:
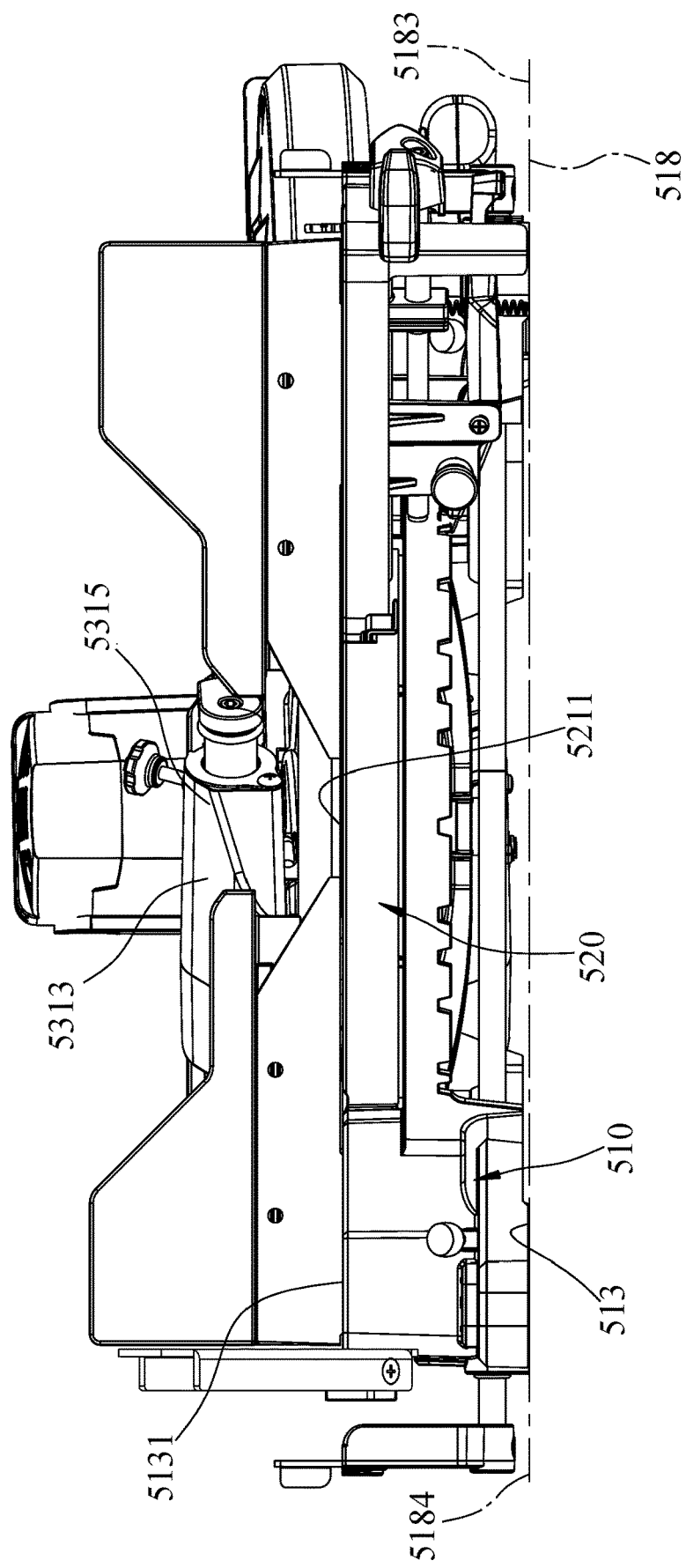
FIG. 16 is a schematic front view of the second embodiment of the present invention, illustrating the foldable miter saw in the folded position.

Referring also to FIG. 15, a rectangular reference plane 518 is formed in parallel to the bottom wall 513. The rectangular reference plane 518 has a first side 5181 corresponding to the front edge 511, a second side 5182 corresponding to the rear edge 512, a third side 5183 corresponding to the first side edge 514, a fourth side 5184 corresponding to the second side edge 515, a first corner 5185 at the connection between the first side 5181 and the third side 5183, and a second corner 5186 at the connection between the second side 5182 and the fourth side 5184 and opposite to the first corner 5185.

The base unit 510 further comprises a foot stand 519 pivotally connected to one foot stand holder 517. The foot stand 519 comprises a pivot-connection end 5191 located at one end thereof and pivotally connected to the foot stand holder 517, and a bearing end 5192 located at an opposite end which is distal from the pivot-connection end 5191. The foot stand 519 is foldable between a collapsed position in proximity to the bottom wall 511 (see FIGS. 12 and 13), and a supporting position far from the bottom wall 511 (see the imaginary line in FIG. 14 and FIG. 18).

The worktable 520 is rotatably mounted on a top wall of the disk-like bottom frame 516 of the base unit 510, comprising a turntable 521, an axle holder 522 facing toward the rear edge 512 and connected to the turntable 521, an extension member 523 facing toward the front edge 511 and connected to the turntable 521, and a positioning member 524 connected to the axle holder 522 fastened to the cutting unit 530. The turntable 521 defines a working surface 5211 opposite to the bottom wall 513 and corresponding to the top wall 5131. The axle holder 522 comprises an axis L extending from the rear edge 512 toward the front edge 511 in a parallel manner relative to the working surface 5211, and an operable locking pin 5221.

The cutting unit 530 comprises a support base 531 pivotally coupled to the axle holder 522 of the worktable 520 and biasable relative to the base unit 510 and the worktable 520, a sliding member 532 coupled to and slidable along the support base 531, a cantilever 533 pivotally connected to the sliding member 532, a saw blade 534 mounted at the cantilever 533 and having left and right end faces disposed in parallel, and a driver 535 mounted at the cantilever 533 and adapted for driving the saw blade 534 to rotate. In this embodiment, the driver 535 is motor coupled with the saw blade 534 by a belt transmission mechanism. The center of gravity of the motor is located at the side of the left end face of the saw blade 534, as shown in FIG. 12.

The support base 531 comprises a pivot-connection portion 5311 pivotally connected to the axle holder 522, a connection portion 5312 connected to the pivot-connection portion 5311, and a guiding member 5313 for enabling the sliding member 532 to slide thereon. The guiding member 5313 is connected to the connection portion 5312 opposite to the pivot-connection portion 5311. The guiding member 5313 comprising an outer end 5314 corresponding to the pivot-connection portion 5311, an inner end 5315 opposite to the outer end 5314 and constantly suspended above the working surface 5211, and a pair of sliding grooves 5316 (not shown) extended from the outer end 5314 to the inner end 5315. Operating the positioning member 524 can lock the pivot-connection portion 5311 to the axle holder 522, or bias the pivot-connection portion 5311 relative to the axle holder 522.

The sliding member 532 comprises a pair of sliding coupling components 5321 slidable relative to the guiding member 5313. In this embodiment, the sliding coupling components 5321 are round rods respectively slidably coupled to the sliding grooves 5314 (formerly defined as outer end) The sliding coupling components 5321 defines a connection plane P1 (Not shown in drawings) that is substantially perpendicular to the two end faces of the saw blade 534. The saw blade 534 is disposed between the two coupling components 5321.

Figure 19:
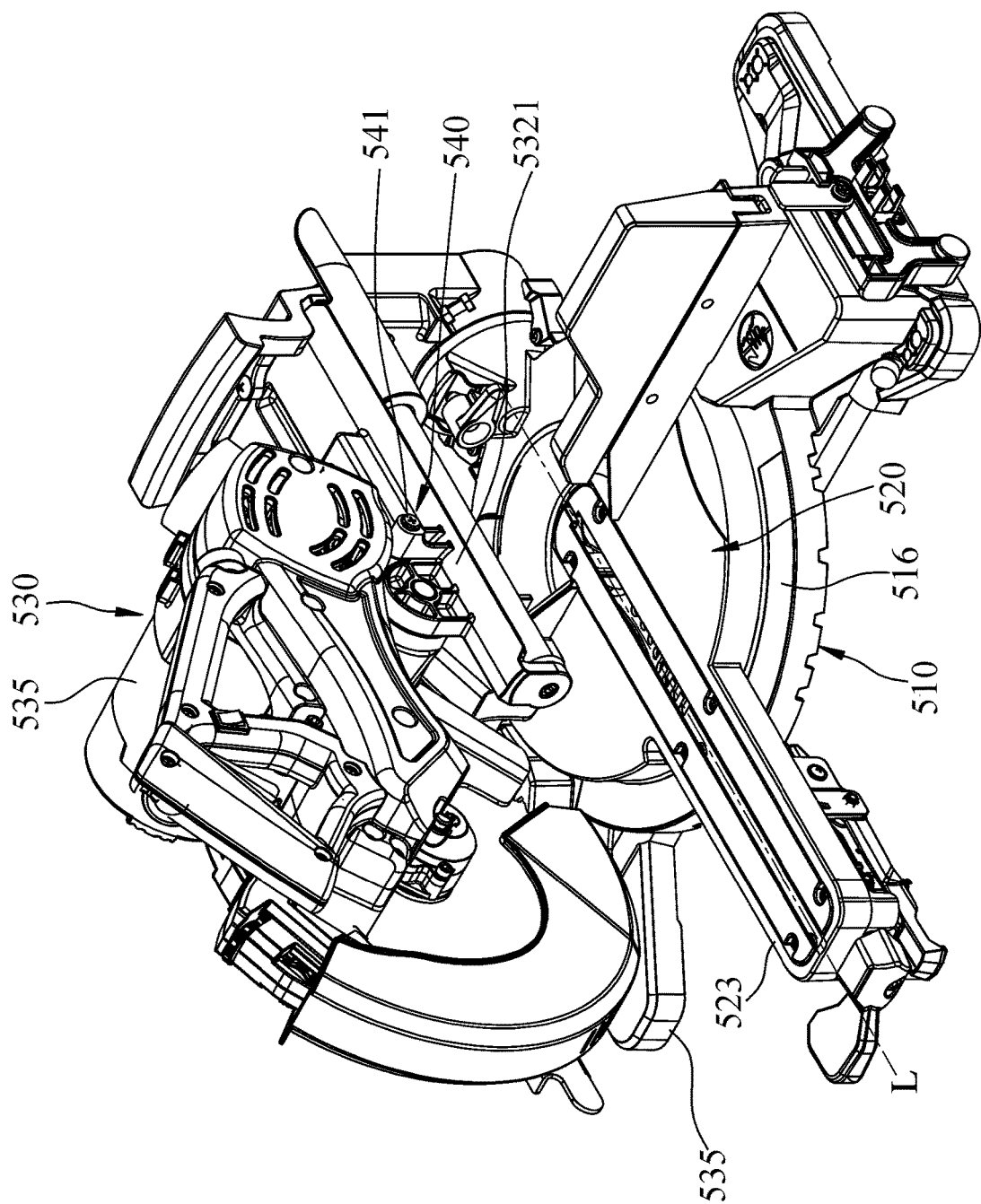
FIG. 19 is an oblique rear elevational view of the foldable miter saw in accordance with the second embodiment of the present invention.
Figure 20:
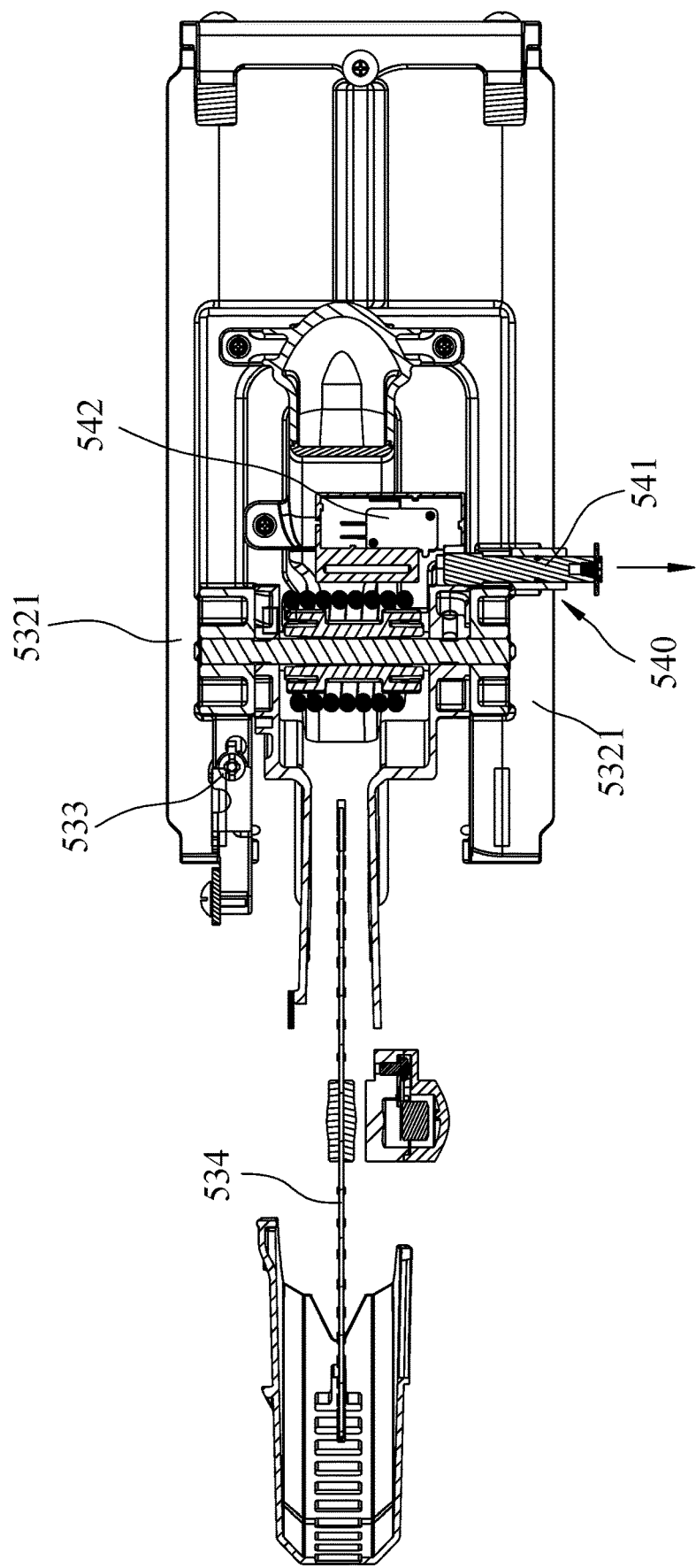
FIG. 20 is a sectional view of a part of the second embodiment of the present invention, illustrating the safety switch unit in the open position.
Figure 21:
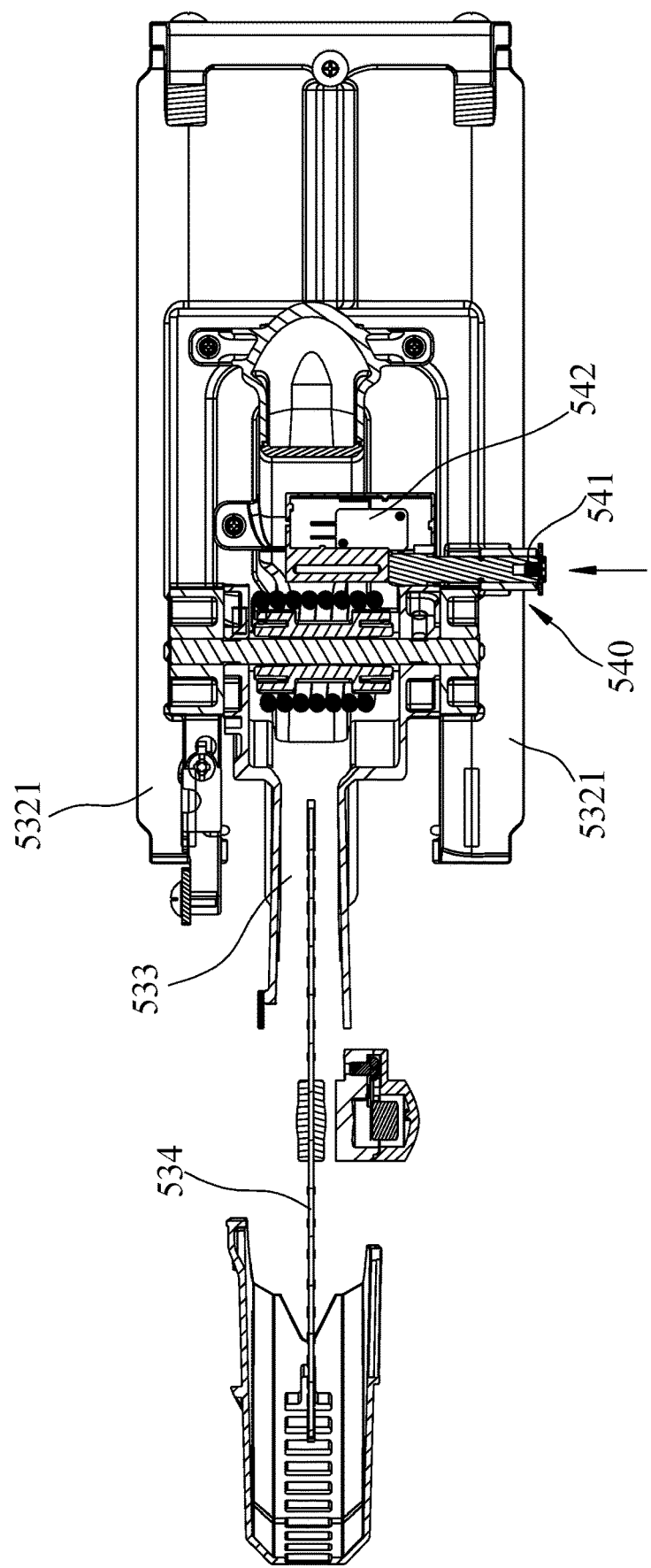
FIG. 21 corresponds to FIG. 20, illustrating the safety switch unit in the close position.

Referring also to FIGS. 19 and 20, the safety switch unit 540 comprises a safety pin 541 mounted at a top side of the sliding coupling components 5321, and a safety switch 542 mounted at the cantilever 533.

As illustrated in FIG. 12, when the adjustable miter saw is set in the working position, the driver 535 is suspended above the working surface 5211 of the worktable 520. After placing the workpiece to be cut on the working surface 5211, the user can move the sliding member 532, cantilever 533, saw blade 534 and driver 535 of the cutting unit 530 relative to the support base 531 in a direction parallel to the axis L, and then drive the cantilever 533 to bias the saw blade 534 downwardly relative to the sliding member 532 to cut the workpiece vertically.

If the operator operates the extension member 523 of the worktable 520 to bias the cutting unit 530 relative to the base unit 510 during the cutting operation, the cutting unit 530 can be driven to perform a miter cut.

If the operator loosens the positioning member 524 and turns the whole assembly 53 of the cutting unit 530 about the axis L relative to the worktable 520 through a predetermined angle to have a predetermined contained angle be defined between the saw blade 534 and the working surface 5211, the foldable miter saw can be operated to perform bevel cuts.

If the foldable miter saw is temporarily not in use and needs to be stored or packed for delivery, the operator can operate the cantilever 533 to bias the saw blade 534 toward the sliding coupling components 5321, and then press the safety pin 541 toward the inside of the cantilever 533 to trigger the safety switch 542 (see FIG. 21), thereby cutting off power supply from the driver 535. At this time, the safety pin 541 is located in the off position, for ensuring operational safety. Further, as illustrated in FIG. 13, the operator can operate the cutting unit 530 to move the sliding member 532, the cantilever 533, the saw blade 534 and the driver 535 relative to the support base 531 to the direction where the saw blade 534 is disposed in proximity to the guiding member 5313, and then rotate the worktable 520 and the cutting unit 530 relative to the base unit 510 in the counter-clockwise direction shown in FIG. 13 to the extent, and then loosen the positioning member 524 and turn the pivot-connection portion 5311 of the cutting unit 530 about the axis L relative to the axle holder 522 to the position where one end face of the saw blade 534 is disposed in proximity to the working surface 5211, converting the cutting unit 530 into the folded position (see FIG. 14). At this time, the contained angle between one end face of the saw blade 534 and the working surface 5211 is within 10°~0° angle where one end face of the saw blade 534 is substantially disposed in parallel to the working surface 5211 and also in proximity to the working surface 5211 and, the center of gravity of the driver 535 is located at one side of the other end face of the saw blade 534.

Figure 17:
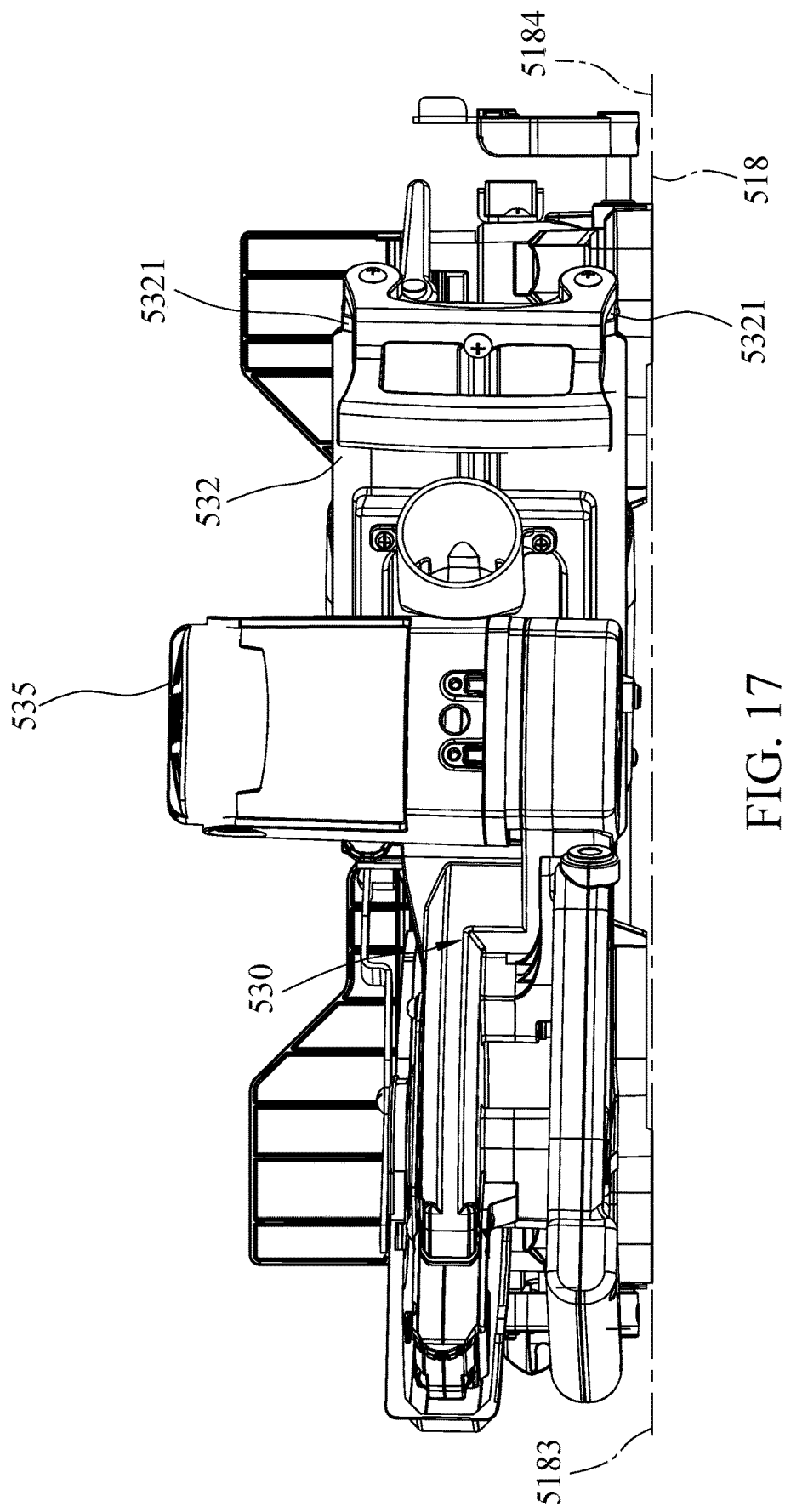
FIG. 17 is a schematic rear view of the second embodiment of the present invention, illustrating the foldable miter saw in the folded position.

As illustrated in FIGS. 14-17, when the cutting unit 530 is in the folded position, the distal end of the extension member 523 is disposed in proximity to (and pointing toward) the first corner 5185; the guiding member 5313 and the sliding coupling components 5321 are disposed in proximity to the rectangular reference plane 518; the inner end 5315 of the guiding member 5313 is disposed in proximity to the working surface 521; one sliding coupling component 5321 is located between the working surface 5211 and the bottom wall 513 (see FIG. 17); the distal ends of the sliding coupling component 5321 are disposed in proximity to the second corner 5186. Therefore, after folding up the foldable miter saw, the distal end of the extension member 523 is disposed in proximity to the first corner 5185 and the distal ends of the sliding coupling components 5321 are disposed in proximity to the second corner 5186, thus, as shown in FIG. 15, the width between the first side 5181 and the second side 5182 is significantly reduced compared to that in the working position, the length between the third side 5183 and the fourth side 5184 is also significantly reduced compared to that in the working position. Further, as shown in FIG. 17, because one sliding coupling component 5321 is disposed between the working surface 5211 and the bottom wall 513 at this time, the height between the bottom wall 513 and the opposite side is also significantly reduced. Therefore, when the foldable miter saw is folded up, the dimension of the foldable miter saw is significantly reduced for packaging, saving on the delivery cost.

Figure 8:
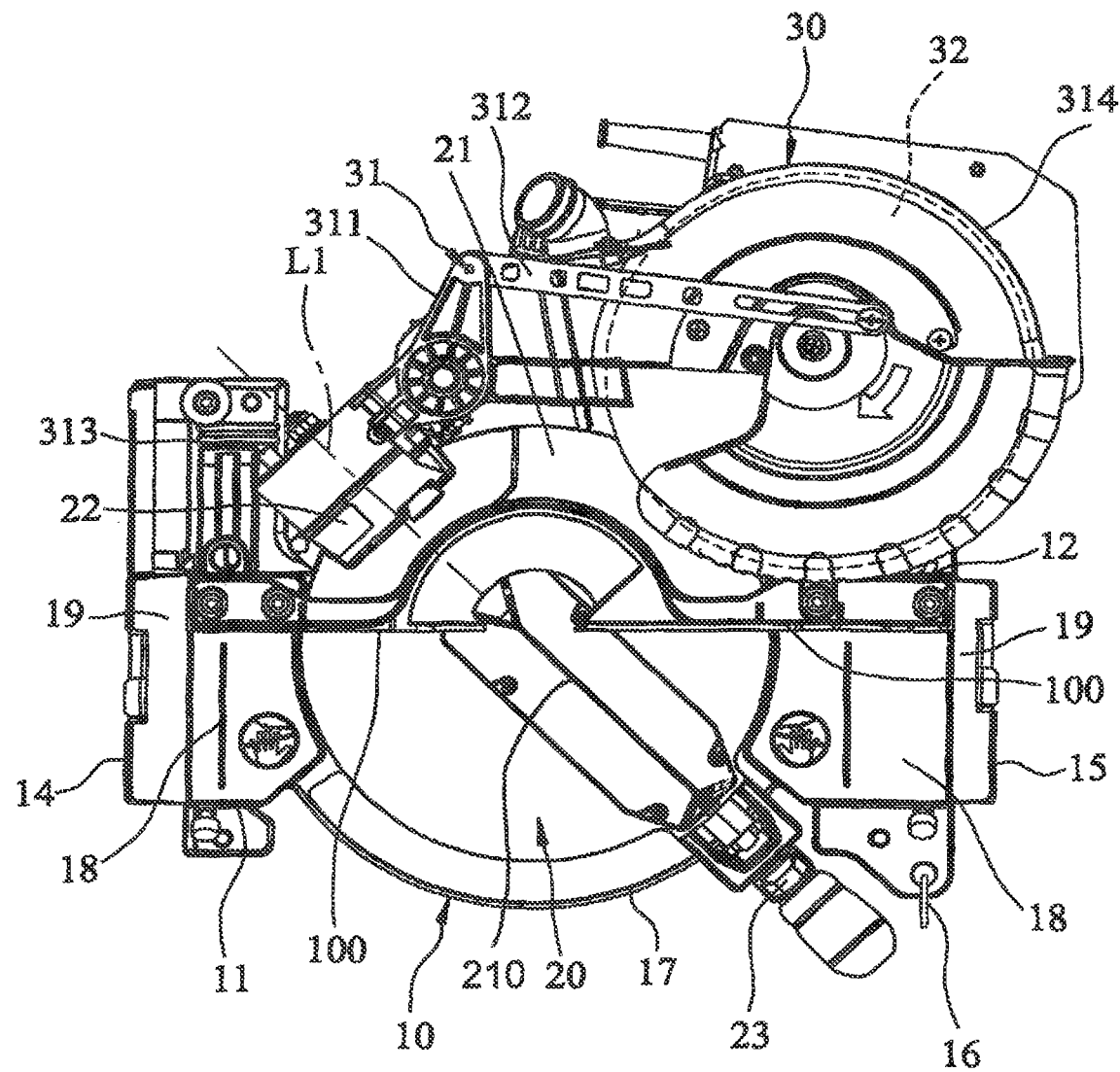
FIG. 8 is a top plane view of the present invention, illustrating the foldable miter saw in the folded position.
Figure 9:
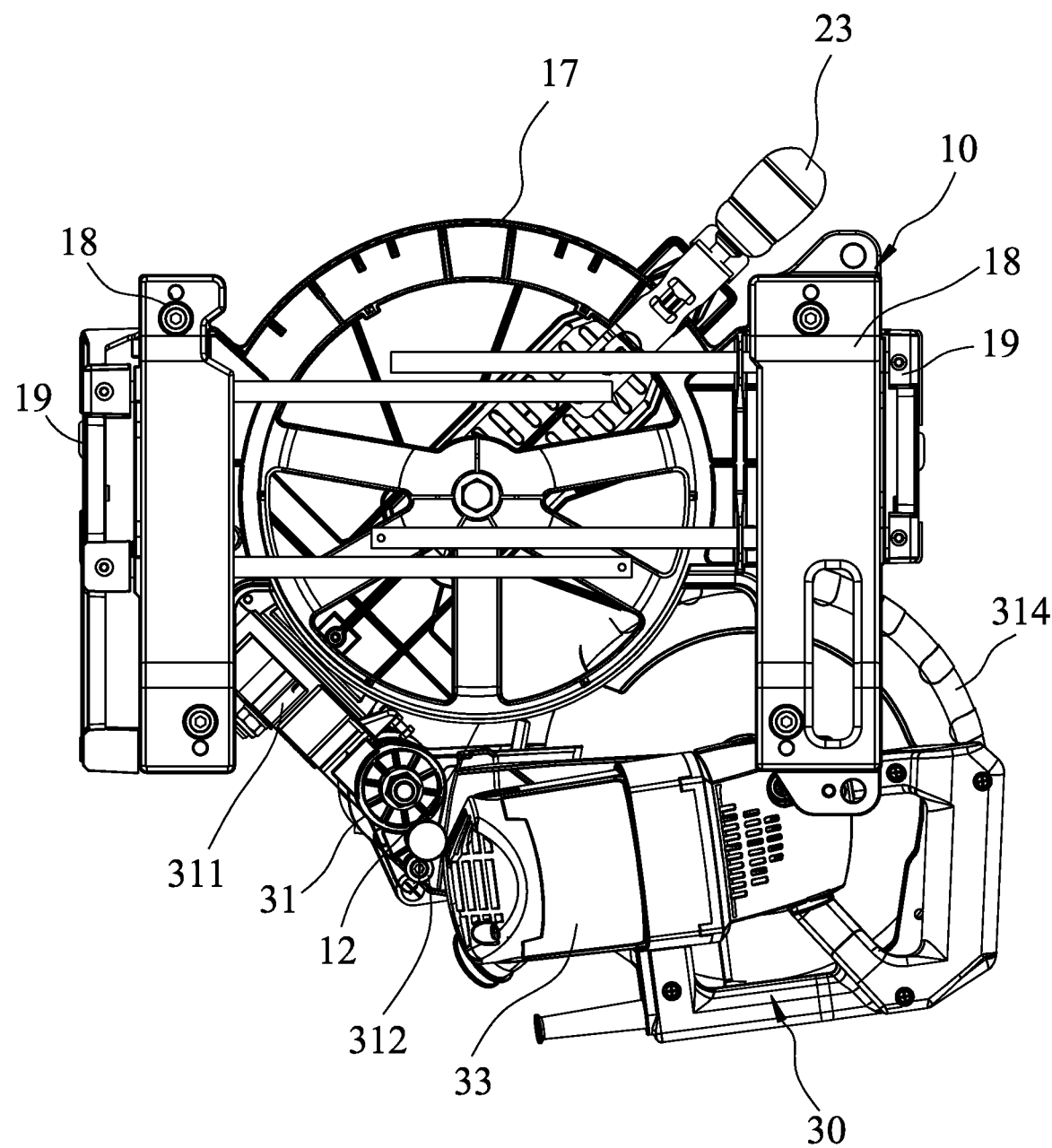
FIG. 9 is a bottom plan view of the present invention, illustrating the foldable miter saw in the folded position.

When wishing to convert the foldable miter saw from the folded position to the working position, move the cutting unit 530 to the position shown in FIG. 1 and FIG. 8, and then operate the cantilever 533 to bias the saw blade 534 relative to the sliding coupling component 5321 in direction away from the sliding coupling component 5321, and then pull (retract) the safety pin 541 from the off position to the on position (see FIG. 20). When the safety pin 541 reaches the on position, it is kept far from the safety switch 542, and the driver 535 is electrically connected.

Figure 14:
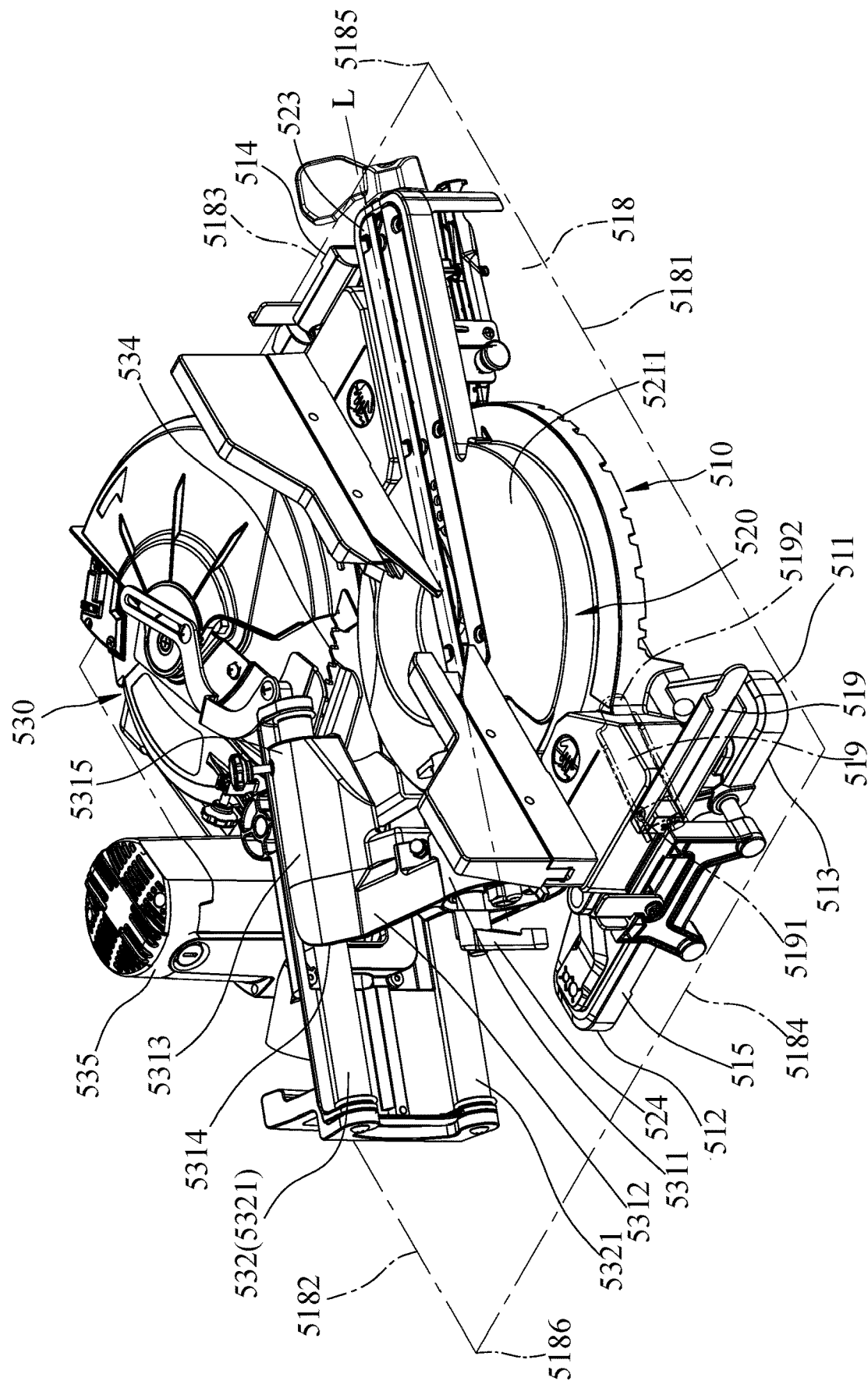
FIG. 14 is a schematic drawing of the second embodiment of the present invention, illustrating the foldable miter saw in a folded position.
Figure 18:
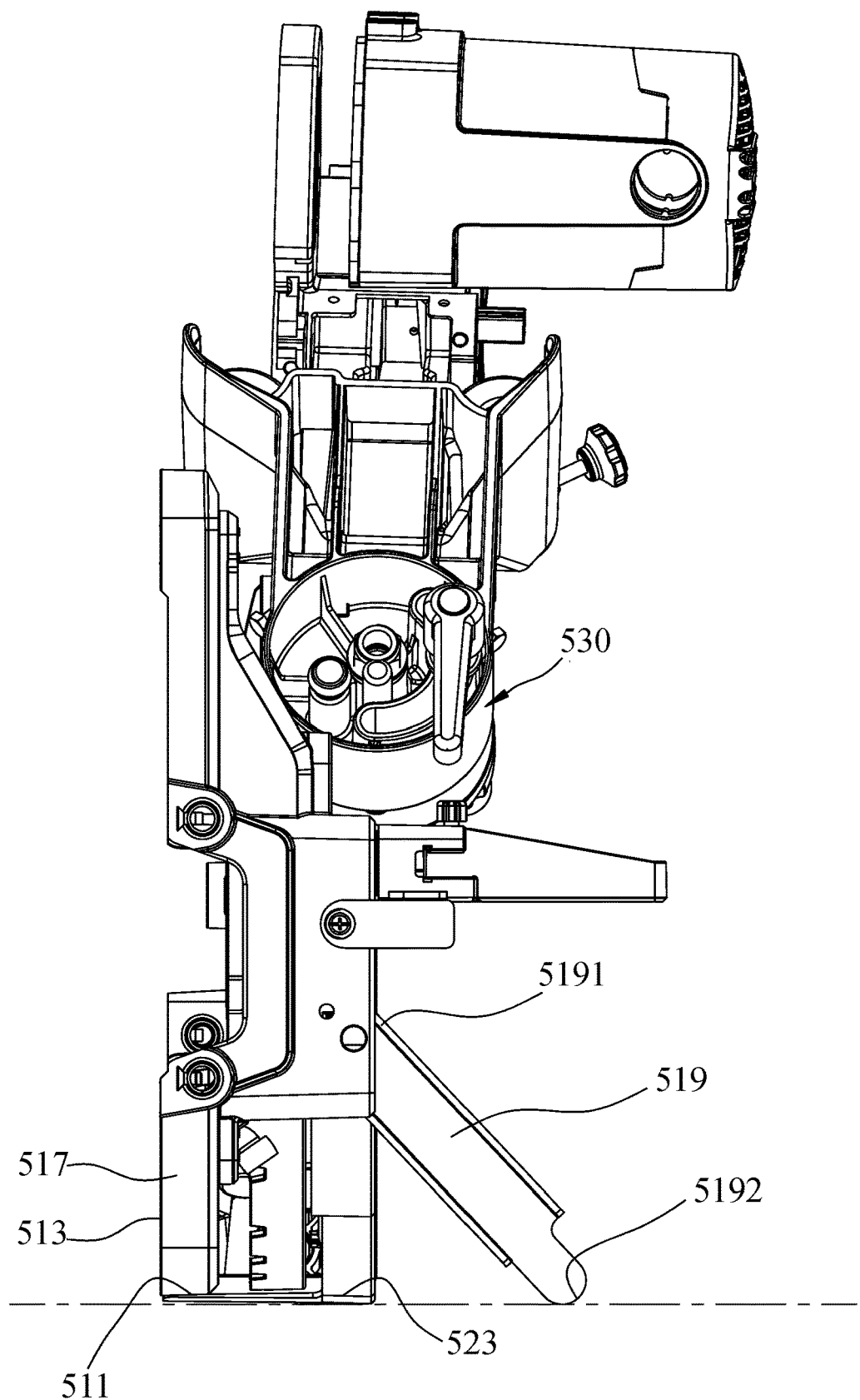
FIG. 18 is a schematic drawing of the second embodiment of the present invention, illustrating the foldable miter saw set in the folded position and erected on the floor.

Further, as shown in the imaginary line in FIG. 14 and FIG. 18, when the cutting unit 530 is set in the folded position, the front edge 511 of one foot stand holder 517, the bearing end 5192 of the foot stand 519 and the distal end 5412 of the extension member 523 can be positioned on the floor to support the foldable miter saw in a standing position (upright configuration) steadily in a 3-point support manner, minimizing storage space occupation.

The foldable miter saws of the present invention can be conveniently set between a working position for cutting operation and a folded position for storage or delivery with minimized space occupation to save delivery cost and storage space.

Although first and second embodiments of the invention have been described in detail for purposes of illustration, various modifications and enhancements may be made without departing from the spirit and scope of the invention.

In conclusion, the invention provides a foldable miter saw that can be conveniently converted to the working position for performing a cutting operation, and can also be conveniently converted to a folded position. When the foldable miter saw is in the folded position, the arrangement of the driver 33 and the cutting unit 30 can be turned to the back side of the base unit 10, the dimension of the foldable miter saw can be significantly reduced, facilitating storage and delivery and reducing the miter saw delivery cost.

Although particular embodiments of the invention have been described in detail for purposes of illustration, various modifications and enhancements may be made without departing from the spirit and scope of the invention.

What is claimed is:

1. A foldable miter saw, comprising:
   a base unit comprising a front edge, a rear edge opposite to said front edge, a bottom wall extended from said front edge to said rear edge, and a top wall opposite to said bottom wall;
   a worktable mounted at said base unit, said worktable comprising a working surface including a longitudinal slot and disposed opposite to said bottom wall and corresponding to said top wall and an axle holder facing toward said rear edge and connected to said working surface, wherein a support arm is fixed to said axle holder and rotatable about an axis disposed in parallel to said working surface and extending from said rear edge toward said front edge; and
   a cutting unit comprising the support arm, a saw blade mounted on said support arm, and a driver mounted at said support arm and adapted for driving said saw blade to rotate, said saw blade comprising a first end face and a second end face opposite to the first end face,
   wherein the support arm is configured to be rotated about said axis to pivot the saw blade between working positions within a contained angle of 90° to 45° formed between the saw blade and the worktable,
   wherein the support arm is further configured to enable the saw blade to be pivoted toward and away from said base unit and said worktable between a lifted position and a pressed position when said support arm is locked in one of said working positions,
   wherein, in the lifted position, the saw blade is spaced from the worktable, and in the pressed position, an edge of the saw blade enters the longitudinal slot in at least at the 90° and 45° working positions,
   wherein, said support arm is configured to be further rotated about said axis relative to said base unit and said worktable from said one of the working positions within the contained angle of 90° to 45° to a folded position that is outside the contained angle of 90° to 45°,
   wherein, in said folded position, the cutting unit is lockable relative to the worktable to facilitate delivery and storage of the miter saw; said second end face of the saw blade is located in proximity to said working surface and facing toward said working surface, and said edge of the saw blade is positioned away from and unable to enter the longitudinal slot.

2. The foldable miter saw as claimed in claim 1, wherein said driver of said cutting unit is oriented toward said second end face of said saw blade; when said cutting unit is set in said one of said working positions, said driver is suspended above said working surface of said worktable; when said cutting unit is set in said folded position, said driver is located at a back side relative to said worktable in proximity to said bottom wall to face toward said rear edge.

3. The foldable miter saw as claimed in claim 2, wherein said driver of said cutting unit has a length in parallel to said saw blade and a width perpendicular to said saw blade, said length being larger than said width.

4. The foldable miter saw as claimed in claim 2, wherein said base unit further comprises a left edge disposed between said front edge and said rear edge, a right edge disposed opposite to said left edge, and two hanging rings located spaced from each other and respectively connected to said right edge; the foldable miter saw further comprises a shoulder strap, said shoulder strap comprising two buckles respectively and detachably connected to said hanging rings.

5. The foldable miter saw as claimed in claim 4, wherein said left edge of said base unit comprises a flat surface portion perpendicularly intersected with said bottom wall and extended from said bottom wall toward said top wall, and a protruding portion connected to a top side of said flat surface portion and protruded outwardly from said flat surface portion in proximity to said top wall.

6. The foldable miter saw as claimed in claim 1, wherein said support arm of said cutting unit comprises a rotating member pivotally connected to said axle holder of said worktable and extending along said axis, and a cantilever member pivotally connected to said rotating member, said rotating member and said cantilever member being disposed at a back side relative to said worktable when said cutting unit is set in said folded position.

7. The foldable miter saw as claimed in claim 6, wherein said support arm of said cutting unit further comprises a locking member disposed in parallel to said axis and adapted for locking said rotating member to said axle holder at a selected said contained angle in said working position, and also for locking the cutting unit in said folded position.

8. The foldable miter saw as claimed in claim 1, wherein said base unit further comprises a fence fixedly mounted at said top wall and extendable to a top side of said working surface of said worktable; said cutting unit is disposed at a back side relative to said fence when said cutting unit is set in said folded position.

9. A miter saw folding method, comprising the steps of:
   (A) preparing a miter saw comprising a base unit, a worktable and a cutting unit, said base unit comprising a front edge, a rear edge opposite to said front edge, a bottom wall extended from said front edge to said rear edge, a top wall opposite to said bottom wall and a fence fixedly mounted at said top wall, said worktable being mounted at said base unit, said worktable comprising a working surface including a longitudinal slot and disposed opposite to said bottom wall and corresponding to said top wall and an axle holder facing toward said rear edge and connected to said working surface, wherein a support arm is fixed to said axle holder and rotatable about an axis disposed in parallel to said working surface and extending from said rear edge toward said front edge, said cutting unit comprising the support arm, a saw blade mounted on said support arm, and a driver mounted at said support arm and adapted for driving said saw blade to rotate, said saw blade comprising a first end face and a second end face opposite to the first end face, wherein the support arm is configured to be rotated about said axis to pivot the saw blade between working positions within a contained angle of 90° to 45° formed between the saw blade and the worktable, and wherein the support arm is further configured to enable the saw blade to be pivoted toward and away from said base unit and said worktable between a lifted position and a pressed position when the support arm is locked in a working position, wherein, in the lifted position, the saw blade is spaced from the worktable, and in the pressed position, an edge of the saw blade enters the longitudinal slot in at least at the 90° and 45° working positions;

(B) enabling said cutting unit to be disposed in the working position and to rotate, while in said working position, about said axis within a contained angle of 90° to 45° between said saw blade and said worktable to change a cutting angle of the saw blade;

(C) operating said base unit and said cutting unit for relative rotation therebetween; and (D) pivotally moving said support arm relative to said axle holder to further rotate said cutting unit about said axis relative to said worktable from said working position to a folded position that is outside the contained angle of 90° to 45° and in which said second end face of said saw blade is disposed in proximity to said working surface, the cutting unit is lockable relative to the worktable to facilitate delivery and storage of the miter saw, and said edge of the saw blade is positioned away from and unable to enter the longitudinal slot.

10. The saw folding method as claimed in claim 9, wherein in step (C) operating said base unit and said cutting unit for relative rotation therebetween is to rotate said worktable relative to said base unit.

11. The miter saw folding method as claimed in claim 10, wherein in step (A), said driver of said cutting unit faces toward said second end face of said saw blade; in step (B), said cutting unit is disposed in said working position where said driver is suspended above said working surface of said worktable; in step (D), said cutting unit is disposed in said folded position where said driver is disposed at a back side relative to said worktable and in proximity to said bottom wall to face toward said rear edge.

* * * * *